US012558896B2

(12) United States Patent
Schmid et al.

(10) Patent No.: US 12,558,896 B2
(45) Date of Patent: Feb. 24, 2026

(54) ELECTROHYDRODYNAMIC PRINT HEAD WITH INK PINNING

(71) Applicant: Scrona AG, Zurich (CH)

(72) Inventors: Martin Schmid, Zürich (CH); Julian Schneider, Muttenz (CH); Patrick Galliker, Richterswil (CH)

(73) Assignee: Scrona AG, Zürich (CH)

( * ) Notice: Subject to any disclaimer, the term of this patent is extended or adjusted under 35 U.S.C. 154(b) by 181 days.

(21) Appl. No.: 18/272,309

(22) PCT Filed: Jan. 14, 2021

(86) PCT No.: PCT/EP2021/050674
§ 371 (c)(1),
(2) Date: Jul. 13, 2023

(87) PCT Pub. No.: WO2022/152380
PCT Pub. Date: Jul. 21, 2022

(65) Prior Publication Data
US 2024/0059064 A1 Feb. 22, 2024

(51) Int. Cl.
*B41J 2/14* (2006.01)

(52) U.S. Cl.
CPC .................................. *B41J 2/1433* (2013.01)

(58) Field of Classification Search
CPC ..................................................... B41J 2/1433
See application file for complete search history.

(56) References Cited

U.S. PATENT DOCUMENTS

| | | | |
|---|---|---|---|
| 3,949,410 | A | 4/1976 | Bassous et al. |
| 5,400,061 | A | 3/1995 | Horio et al. |
| 6,007,187 | A | 12/1999 | Kashino et al. |

(Continued)

FOREIGN PATENT DOCUMENTS

| | | |
|---|---|---|
| CN | 1072115 | 10/2001 |
| CN | 1749009 | 3/2006 |

(Continued)

OTHER PUBLICATIONS

Taiwan Office Action (TW SR/OA) conducted in counterpart Taiwan Appln. No. 111101245 (Jun. 6, 2025).

(Continued)

*Primary Examiner* — Jason S Uhlenhake
(74) *Attorney, Agent, or Firm* — GREENBLUM & BERNSTEIN, P.L.C.

(57) ABSTRACT

The electrohydrodynamic print head comprises a nozzle carrier with a plurality of nozzles arranged thereon. A plurality of electrodes associated with the nozzles are located on the front side of the nozzles. A support structure supporting the electrodes is located on the nozzle carrier and comprises a plurality of support elements arranged between the nozzles. Ink retainers are arranged between the nozzles and the support elements. The front surfaces of the ink retainers are located behind the front ends of the nozzles in order to prevent the nozzles from being submerged by ink. Guard electrodes can be provided between the ejection electrodes and the ink retainers to reduce the electrical fields at the ink retainers and thereby to improve their efficiency to pin the ink. Suction ducts surrounding each nozzle allow to remove ink from the nozzles.

37 Claims, 11 Drawing Sheets

(56) References Cited

U.S. PATENT DOCUMENTS

| | | | |
|---|---|---|---|
| 6,631,983 B2 | 10/2003 | Romano, Jr. et al. | |
| 2004/0183860 A1 | 9/2004 | Furukawa | |
| 2004/0183879 A1 | 9/2004 | Nakazawa et al. | |
| 2005/0062787 A1 | 3/2005 | Furukawa et al. | |
| 2016/0121603 A1 | 5/2016 | Clippingdale, Jr. et al. | |
| 2016/0271968 A1 | 9/2016 | Clippingdale et al. | |
| 2018/0009223 A1 | 1/2018 | Poulikakos et al. | |
| 2021/0138794 A1* | 5/2021 | Chen | B41J 2/1433 |

FOREIGN PATENT DOCUMENTS

| | | |
|---|---|---|
| JP | S60-234852 | 11/1985 |
| JP | 2004-230709 | 8/2004 |
| JP | 2005-096172 | 4/2005 |
| JP | 2005-096333 | 4/2005 |
| JP | 2006-297754 | 11/2006 |
| JP | 2018-505074 | 2/2018 |
| KR | 10-2011-0123407 | 11/2011 |
| WO | 01/30576 | 5/2001 |
| WO | 2013/000558 | 1/2013 |
| WO | 2016/120381 | 8/2016 |
| WO | 2016/169956 | 10/2016 |
| WO | 2017/064310 | 4/2017 |
| WO | 2018/148348 | 8/2018 |
| WO | 2019/189736 | 10/2019 |

OTHER PUBLICATIONS

Korea Office Action conducted in counterpart Korea Appln. No. 10-2023-7023481 (Jul. 11, 2025).

China Office Action conducted in counterpart China Appln. No. 202180090254.5 (Jul. 31, 2025).

Int'l Search Report (Form PCT/ISA/210) conducted in Int'l Appln. No. PCT/EP2021/050674 (Oct. 18, 2021).

Int'l Written Opinion (Form PCT/ISA/237) conducted in Int'l Appln. No. PCT/EP2021/050674 (Oct. 18, 2021).

Europe Extended Search Report (EESR) conducted in counterpart Europe Appln. No. 24189959.0 (Nov. 20, 2024).

Japan Office Action (JP OA) conducted in counterpart Japan Appln. No. 2023-542698 (Nov. 25, 2024).

* cited by examiner

ELECTROHYDRODYNAMIC PRINT HEAD WITH INK PINNING

TECHNICAL FIELD

The invention relates to an electrohydrodynamic print head and to a method for operating the same.

BACKGROUND ART

US 2018/0009223 describes an electrohydrodynamic print head having a nozzle carrier with a plurality of nozzles. It is designed to eject ink along an ejection direction. The nozzles form projections extending along this ejection direction. Ejection electrodes are associated with the nozzles and located on the target-side of the nozzles.

In print heads of this design, ink may form pools that "submerge" the nozzles and disrupt the operation of the print head.

DISCLOSURE OF THE INVENTION

Hence, the problem to be solved by the present invention is to provide a print head and a method for its operation that allow are more reliable printing.

This problem is solved, in a first aspect of the invention, by the print head of the first independent claim.

Accordingly, the print head may comprise at least the following elements:

- A nozzle carrier: This is a substrate on which the nozzles are arranged.
- A plurality of nozzles arranged on the carrier: Each such nozzle forms a projection (i.e. a protrusion) arranged on the "front side" of the nozzle carrier, which is the side that faces the print target during operation. The nozzle extends along the ejection direction of the print head, i.e. along the direction into which the print head is designed to eject ink. The nozzle may extend parallel to the ejection direction or under a small angle, in particular under an angle smaller than 45°, thereto.
- A plurality of ejection electrodes associated with the nozzles and located on the front side of the nozzles: The ejection electrodes are used to e.g. individually eject ink from their associated nozzles.
- A support structure supporting the ejection electrodes on the nozzle carrier. This support structure comprises a plurality of support elements arranged between the nozzles.
- A plurality of ink retainers arranged between the nozzles and the support elements: The ink retainers prevent ink from reaching the support elements and wetting them, i.e. they "pin" the ink pools at defined borders. At a given nozzle, the closest ink retainer is arranged at a distance from the nozzle.

The ink retainers prevent the ink from reaching the support elements. If the ink reached the support elements, it could wet them and form ink pools that might drown the nozzles and thereby prevent the electric field used for droplet ejection to be properly formed.

Advantageously, along the ejection direction, the front surfaces of the ink retainers are located behind (i.e. closer to the nozzle carrier) than the front ends of the nozzles. In other words, along the ejection direction, the ink retainers are set back in respect to the front ends of the nozzles. Since the retainers are located closer to the nozzle carrier than the front ends of the nozzles, the nozzles will extend forward from any ink pools that may form between the nozzles and the retainers, i.e. they will not be "submerged" in these ink pools. It must be noted, though, that the vertical walls of the nozzles may be wetted with ink.

Each ink retainer advantageously forms a ledge that faces away from the nozzle closest to it, thereby assisting the pinning process.

In a particularly advantageous embodiment, the print head comprises a plurality of guard electrodes, which have the purpose to guard the ink retainers from the electrical field generated by the ejection electrodes. At a given nozzle, the guard electrode(s) associated with the nozzle is (are) arranged between the ejection electrode(s) associated with the nozzle and the ink retainer(s) associated with the same nozzle. Since the field of the ejection electrode tends to decrease the surface tension of the ink, this design reduces the risk of the ink wetting its way around the ink retainer.

In particular, the print head may comprise a voltage supply adapted to set the potential of the guard electrodes closer to the potential of the ink retainers than to the (maximum) potential of the ejection electrodes.

The print head may further comprise a plurality of ink supply ducts for the nozzles. The ink supply ducts are arranged, at least in part, in the nozzle carrier. Advantageously, at least one ink supply duct ends at each nozzle. The ink supply ducts are structured to feed ink to the nozzles.

In that case, at a given nozzle, the closest ink retainer surrounds the nozzle and the end section of the supply duct. This allows to retain the ink coming from the supply duct.

In a second aspect of the invention, the invention relates to an electrohydrodynamic print head comprising at least the following parts:

- A nozzle carrier: This is a substrate on which the nozzles are arranged.
- A plurality of nozzles arranged on the carrier: Each such nozzle forms a projection (i.e. a protrusion) arranged on the "front side" of the nozzle carrier, which is the side that faces the print target during operation. The nozzle extends along the ejection direction of the print head, i.e. along the direction into which the print head is designed to eject ink. The nozzle may extend parallel to the ejection direction or under a small angle, in particular under an angle smaller than 45°, thereto.
- A plurality of ejection electrodes associated with the nozzles and located on the front side of the nozzles: The ejection electrodes are used to e.g. individually eject ink from their associated nozzles.
- A plurality of ink supply ducts for the nozzles: At least one ink supply duct ends at each nozzle and feeds ink to it.
- A plurality of ink suction ducts: At least one ink suction duct ends at each nozzle.

The ink suction ducts are structured to feed ink from the nozzles. This allows to prevent excessive amount of ink at a given nozzle.

Same as in the first aspect, this allows to confine the ink to a region around a given nozzle, thereby preventing the nozzle from being submerged in a pool of ink.

The ink supply ducts and suction ducts may be arranged, at least in part, in the nozzle carrier.

Same as in the first aspect of the invention, the print head advantageously comprises a support structure supporting the ejection electrodes on the nozzle carrier. This support structure comprises a plurality of support elements arranged between the nozzles. The suction ducts can be used to prevent the ink from reaching the support elements.

This second aspect is advantageously combined with the first aspects, i.e. the print head has, at a given nozzle, at least one suction duct and at least one ink retainer, and both can cooperate to retain the ink.

At a given nozzle, the closest ink retainer advantageously surrounds not only the nozzle and the end section of the supply duct but also the end section of the suction duct. Hence, the two ducts can be used to maintain a pool of fresh ink in the area surrounded by the ink retainer.

In an advantageous design, the nozzle carrier comprises at least the following parts:

A front layer: The nozzles are mounted to the front side of the front layer.

A backing layer located at the back side of the front layer.

Electrical vias connected to the ejection electrodes extend through the front layer and the backing layer. They feed voltages to the ejection electrodes.

In addition, ink supply ducts are arranged (at least) in the front layer.

In particular, the print head may comprise, in the front layer, interconnect sections for the ink that extend transversally, in particular perpendicularly, to the ejection direction. This allows to interconnect the supply ducts for the nozzles and/or to interconnect the suction ducts for the nozzles and to reduce (or eliminate) the number of ink ducts through the backing layer.

Advantageously, both the front and backing layers are dielectric layers. This design is based on the understanding that the electrical vias need to be guided through these layers and those electrical vias carry high voltages and need to be insulated from each other. Alternatively, the layers may also be formed of a composite of dielectric and non-dielectric material, for example of a silicon wafer where specific regions are covered by a thick layer of thermal silicon dioxide. This technique, however, may only work for a limited voltage regime, since silicon dioxide layers may not be manufacturable in sufficient thickness.

Most preferably, the backing layer is made of glass which provides both electrical insulation and mechanical stability.

The front layer is preferably made of a plurality of photo-active polymer layers, e.g. epoxy-based dry-film laminate which can be easily formed into any form of vertical and horizontal duct structure. Alternatively, horizontal ducts may also be formed by bonding several structured glass layers to each other.

The invention also relates to a method for operating the print head in which ink is confined in region around a given nozzle by using said ink retainer (66) and/or by sucking ink away from the nozzle by using the suction ducts. In both cases, the controlled confinement of the ink allows to prevent the ink from reaching the surrounding support elements and from forming a pool that might submerge the nozzle.

In a particularly important embodiment, the method comprises the step of generating an electrical field at the forward end of at least one of the nozzles, thereby ejecting ink from the forward end. At the same time, however, the electric field at the ink retainer is kept at less than 50%, in particular at less than 10%, of the field strength at the forward end of the nozzle.

BRIEF DESCRIPTION OF THE DRAWINGS

The invention will be better understood and objects other than those set forth above will become apparent when consideration is given to the following detailed description thereof. Such description makes reference to the annexed drawings, wherein:

Note: While the ejection direction X in FIG. 1 points downwards, with the target being located below the print head, the ejection direction X in all other figures depicting vertical sectional views points upwards, i.e. FIG. 1 is rotated by 180° in respect to all other figures showing sections parallel to the ejection direction. The direction in those figures is rather based on how manufacturing progresses, i.e. lower layers are manufactured ahead of top layers.

MODES FOR CARRYING OUT THE INVENTION

Definitions

"Forward" defines the direction into which the print head is designed to eject ink. For example, the ejection electrodes are forward from the nozzles.

"Backward" defines the opposite direction. For example, the nozzles are arranged backward from the ejection electrodes.

"At the front" and "at the back" are understood to designate a location at levels forward from or backward from something else.

"Front" and "back" are the forward and backward sides.

Properties "at a given nozzle" are advantageously understood as properties that are true for a majority, in particular for least at 90%, of the nozzles. For example, if it is said that "at a given nozzle, the guard electrode is arranged between the ejection electrode and the ink retainer", this advantageously means that this is true for a majority of the nozzles, in particular for at least 90% of them. It may e.g. be that there are some nozzles that do not have ejection electrodes and/or guard electrodes, such as nozzles at the edges of the print head and/or unused nozzles.

The ejection direction X of the print head defines the "vertical" upwards direction, i.e. the print head is, by definition, designed to eject ink upwards. (In operation, it may, of course, be under any angle to the direction of gravity.) Hence, definitions such as "above" and "below" are to be understood in reference to this definition of "vertical".

"Horizontal" is any direction perpendicular to the vertical direction.

"Lateral" designates something that is horizontal from something else.

Print Head

Figure 1:
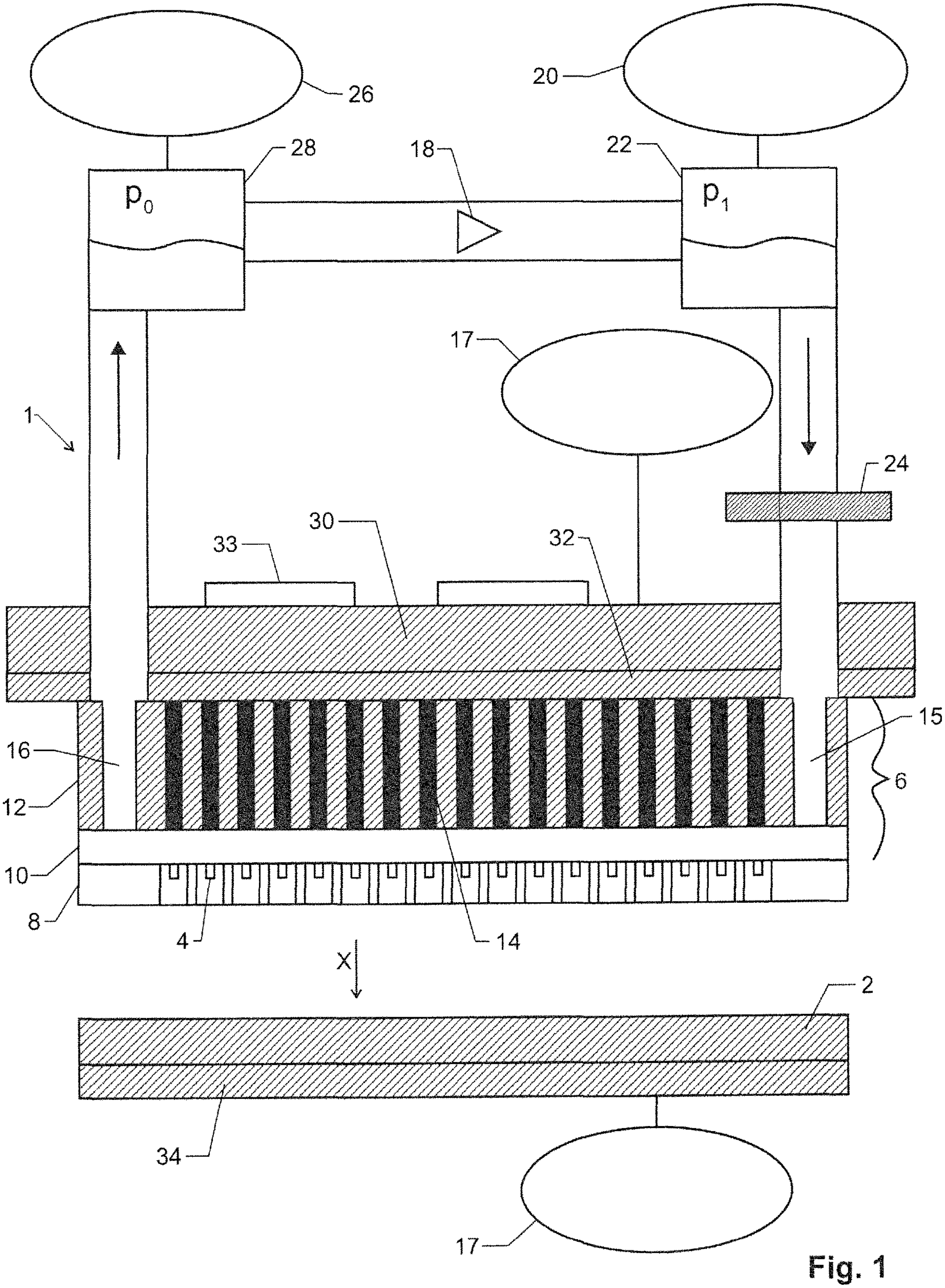
FIG. 1 shows a partially sectional view of a print head and of the target.

FIG. 1 shows a schematic sectional view of an embodiment of the print head 1. It is depicted above a target 2 and it is structured to eject ink along an ejection direction X onto the target.

The print head comprises a plurality of nozzles 4 located at the front side of a nozzle carrier 6. The nozzles 4 may be arranged in a one- or two-dimensional array.

The print head has a plurality of ejection electrodes (not shown in FIG. 1) for ejecting ink from the nozzles 4 and optional further electrodes arranged on a support structure 8, the design of which is described in more detail below. Further electrodes may be provided in electrical contact with the ink to set the ink to a defined electrical potential.

Nozzle carrier 6 comprises a front layer 10, with the nozzles 4 being mounted to the front side of front layer 10 and forming projections thereon. It also comprises a backing layer 12 located at the back side of front layer 10.

The internal structure of front layer 10 is not shown in FIG. 1 and will be described in more detail below. It may e.g. be of a dielectric, in particular a polymer.

Backing layer 12 may e.g. be an insulated semiconductor material or it may be a dielectric. Advantageously, backing layer 12 is, at least partially, of glass.

Electrical vias 14 are connected to the ejection electrodes and extend through front layer 10 and the backing layer 12 for connecting the ejection electrodes to a voltage supply 17. Advantageously, there is at least one via 14 for each nozzle 4. Further vias may be provided to connect other electrodes to voltage supply 17.

Ink ducts 15, 16 supply ink to the nozzles 4 and (optionally) recycle ink back from the nozzles 4. They are located, in part, in front layer 10 and they extend through peripheral regions of backing layer 12. Their design is described in more detail below.

FIG. 1 shows an embodiment of the print head that has supply ducts 15 as well as suction ducts 16 for the ink.

At least one pump 18 and/or another pressure source or vacuum source is provided to supply ink to the supply ducts 15 and, if there are suction ducts, to retrieve ink from the suction ducts 16.

Advantageously, the print head comprises a first pressure control 20 for generating a first defined pressure p1 at the input of the supply ducts 15, e.g. in a reservoir tank 22.

The ink is supplied through an optional filter 24 and the supply ducts 15 to the nozzles 4.

If there are suction ducts 16, they are connected to a suction system, which may comprise a second pressure control 26 for generating a second defined pressure p2 at the exit of the suction ducts 16, e.g. in a suction tank 28. The suction system may also comprise a pump. This may in particular be pump 18 as mentioned above, in which case pump 18 acts as a circulating pump.

A suitable pump design is e.g. shown in U.S. Pat. No. 6,631,983.

As further shown in FIG. 1, the print head may comprise a circuit carrier 30, such as a PCB, arranged at the back side of nozzle carrier 6.

An optional interposer layer 32 may be provided between circuit carrier 30 and nozzle carrier 6 for matching a denser resolution of the vias 14 to the circuit resolution of circuit carrier 30. Such interposer layers are e.g. used in flip-chip designs where semiconductor chips are applied to PCBs.

Circuit carrier 30 carries control circuitry 33, which may e.g. implement at least part of voltage supply 17, such as the driver stage of such a voltage supply, which connects voltage sources to the various electrodes of the print head.

In the shown embodiment, the ink ducts 15, 16 extend through interposer layer 32 (if present) as well as circuit carrier 30.

If the vias 14 have a large enough mutual spacing (e.g. larger than 0.4 mm), they may directly interface with circuit carrier 30 without an interposer layer 32.

Advantageously, target 2 is arranged on an acceleration electrode, which is connected to voltage supply 17 to generate an accelerating electrical field between print head 1 and target 2.

The pressure controls 20, 26 can be used to maintain pressures as described in the section Operating the Print Head below. Advantageously, they allow to separately adjust the pressures in the supply ducts 15 as well as in the pressure ducts 16.

Nozzle Design 1

FIGS. 2-8 show a first embodiment of a nozzle 4 and the surrounding elements. (As mentioned above, in contrast to FIG. 1, the ejection direction X in FIG. 2 points upwards.)

Figure 2:
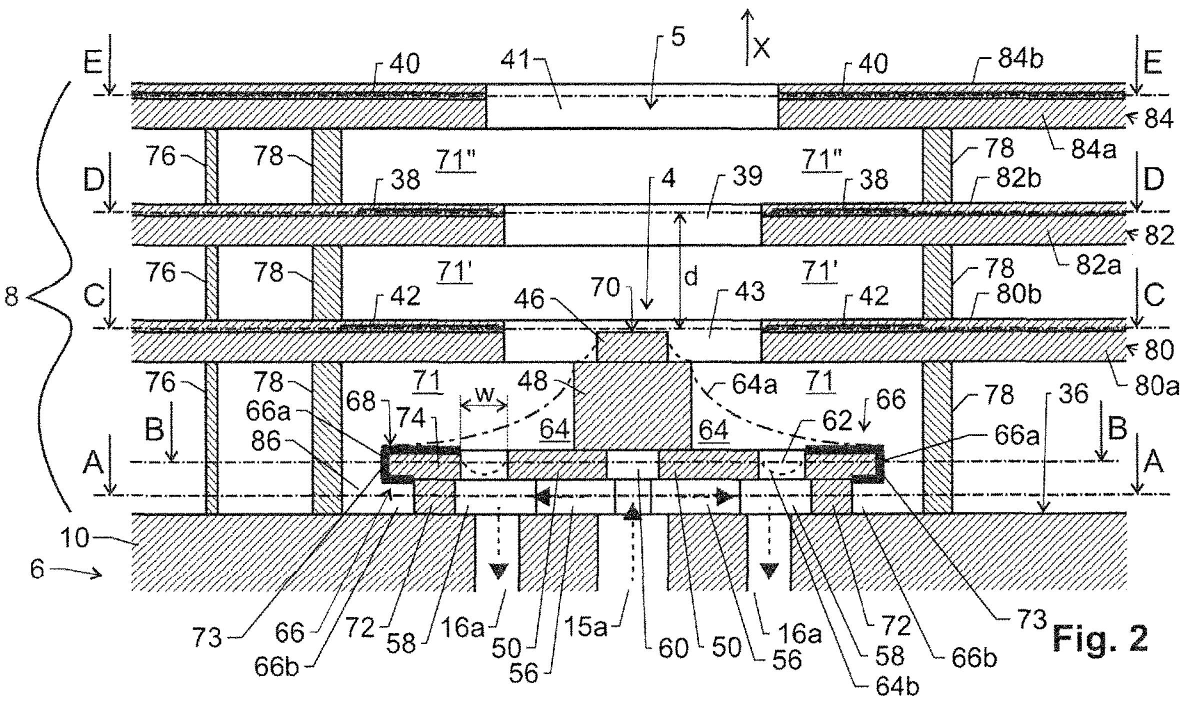
FIG. 2 is a vertical sectional view through a first embodiment of a nozzle.

As can be seen from FIG. 2, nozzle 4 forms a projection on the front side 36 of nozzle carrier 6, e.g. on the front side of its front layer 10. It is located at an exit passage 5 through which ink can be ejected towards target 2.

FIG. 2 also shows the various electrodes that may be associated with the nozzles 4.

Figure 7:
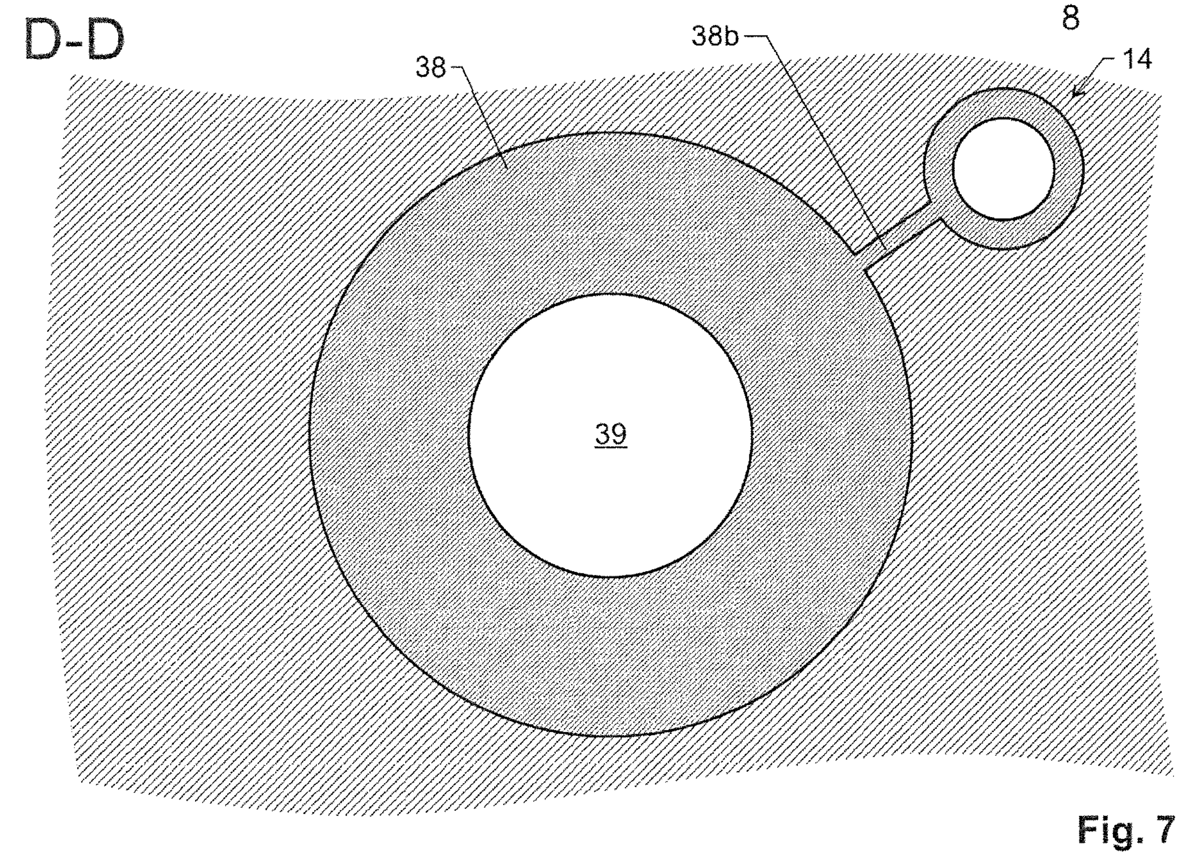
FIG. 7 is a horizontal sectional view along line D-D of FIG. 2.

The ejection electrode 38 is located on the front side of the nozzle 4. In the embodiment of FIGS. 2 and 7, it is annular with a central opening 39 for the passage of the ink. It is connected to one of the vias 14, which extends through support structure 8 and nozzle carrier 6.

Figure 3:
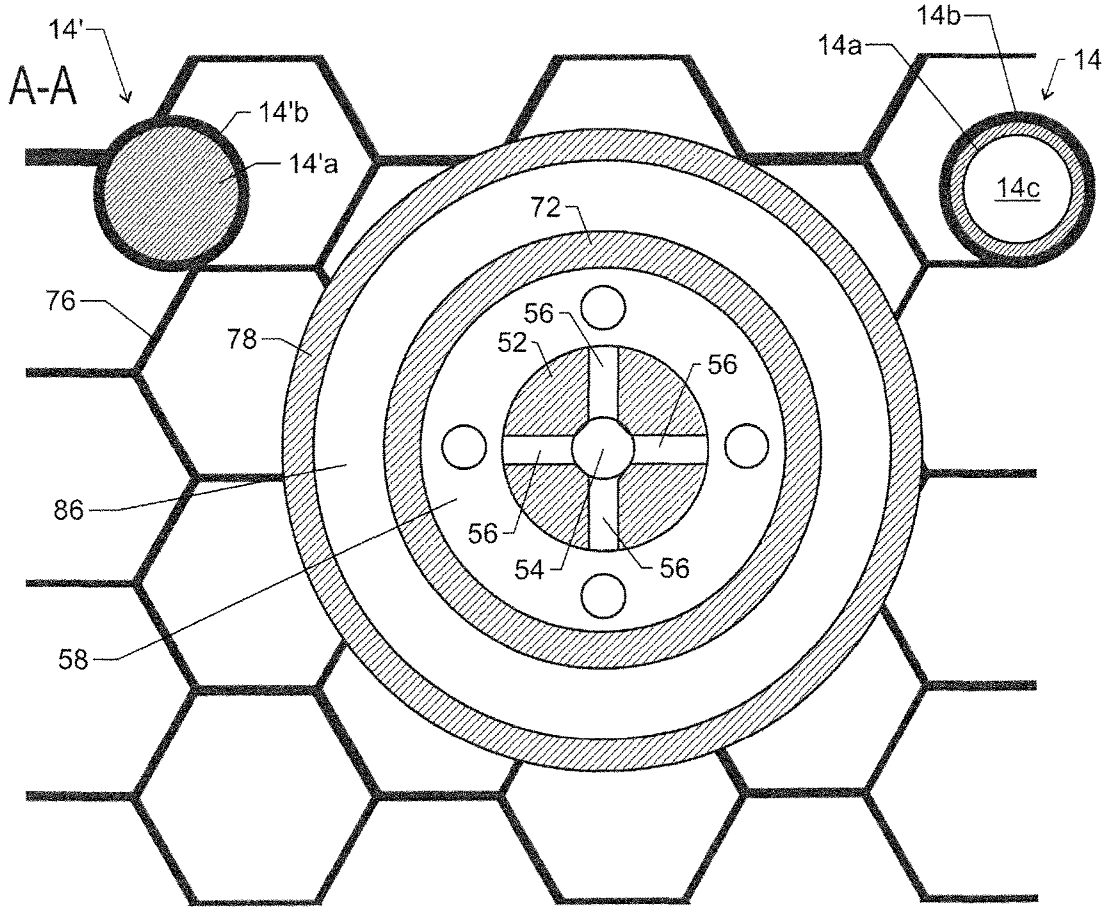
FIG. 3 is a horizontal sectional view along line A-A of FIG. 2.
Figure 4:
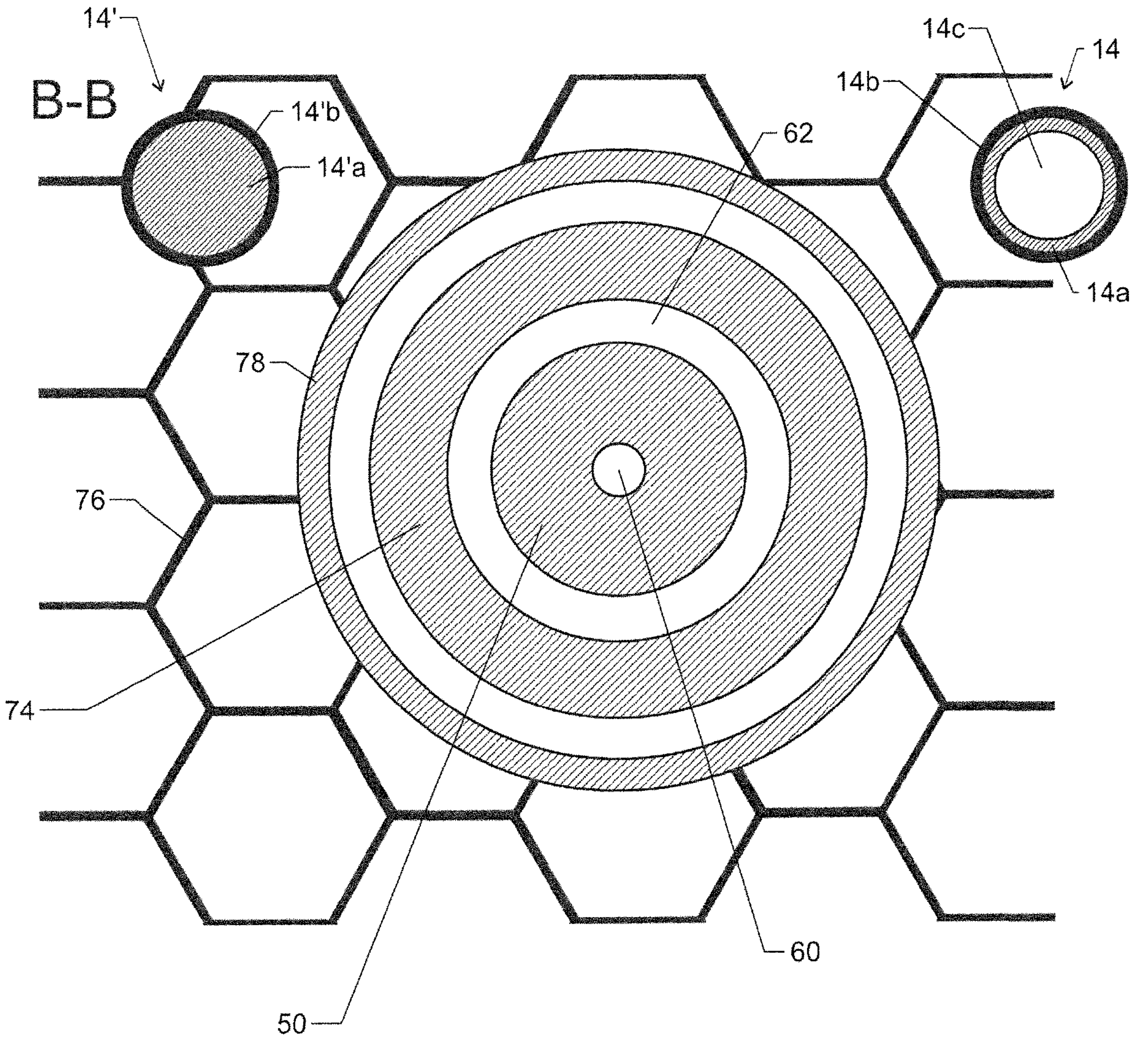
FIG. 4 is a horizontal sectional view along line B-B of FIG. 2.

FIGS. 3 and 4 show two possible implementation of the vias 14. On the right side, under reference number 14, a hollow implementation is shown, where the vias are formed as a metallic coating 14*a* within a dielectric tube 14*b* extending along the ejection direction and surrounding a central duct 14*c*, which may also be used as a ventilation duct for feeding gas to/from the region between the print head and the target. This type of structure can e.g. be formed by a) Forming the tube 14*b* together with the honeycomb structure as described below, and b) Forming the metallic coating 14*a* within tube 14*b* e.g. by sputtering.

The alternative design, shown under reference number 14', comprises a solid metal core 14'*a* within a dielectric tube 14'*b*. Tube 14'*b* can again be formed together with the honeycomb structure as described below, and metallic core 14'*a* can e.g. be formed by means of electro plating.

Figure 17:
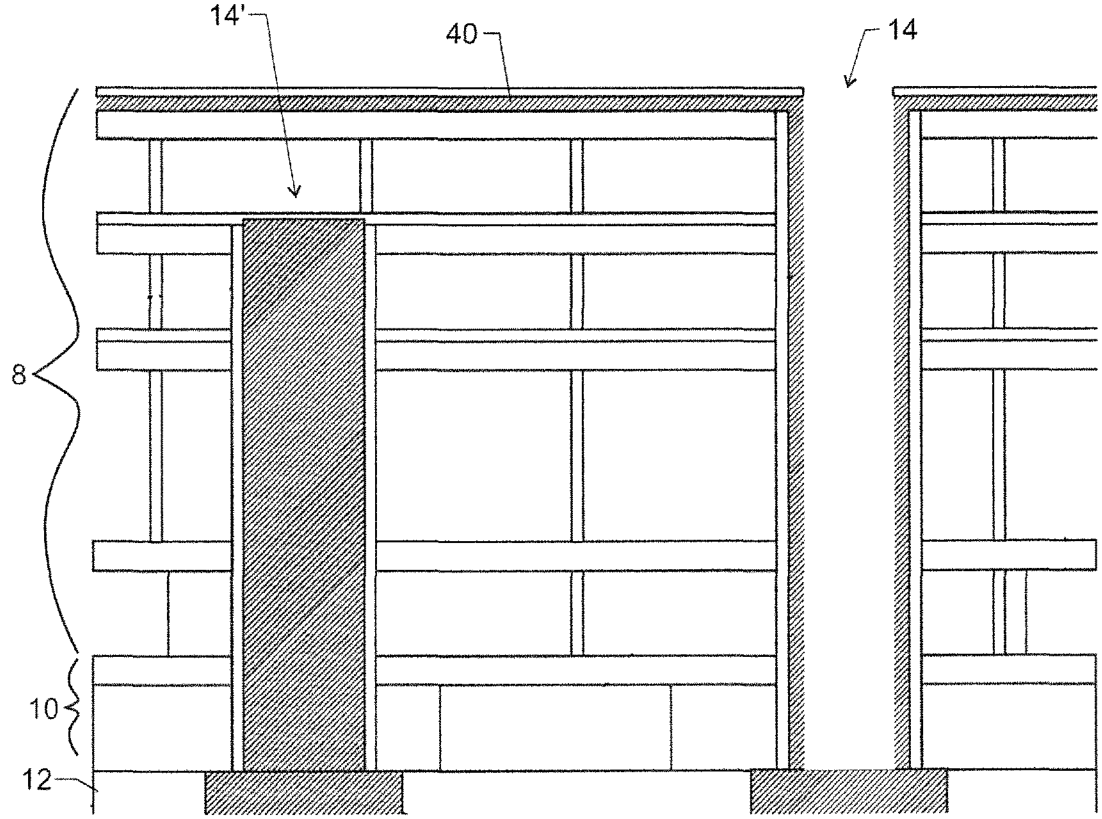
FIG. 17 is a vertical sectional illustrating two possible via designs for wiring of the electrodes.

The alternative via designs 14, 14' are also shown in FIG. 17. The hollow via design 14 is depicted for connecting the shielding electrode 40 while the filled via design 14' is depicted for the ejection electrode 38 (which is not visible in FIG. 17). Note: Only the metal parts are shown as hatched regions in FIG. 17 while other cross-sectioned parts are not hatched.

Typically, a single print head will only use one design of vias, with the two different types in FIGS. 3, 4, and 17 shown for illustration purposes only.

Figure 8:
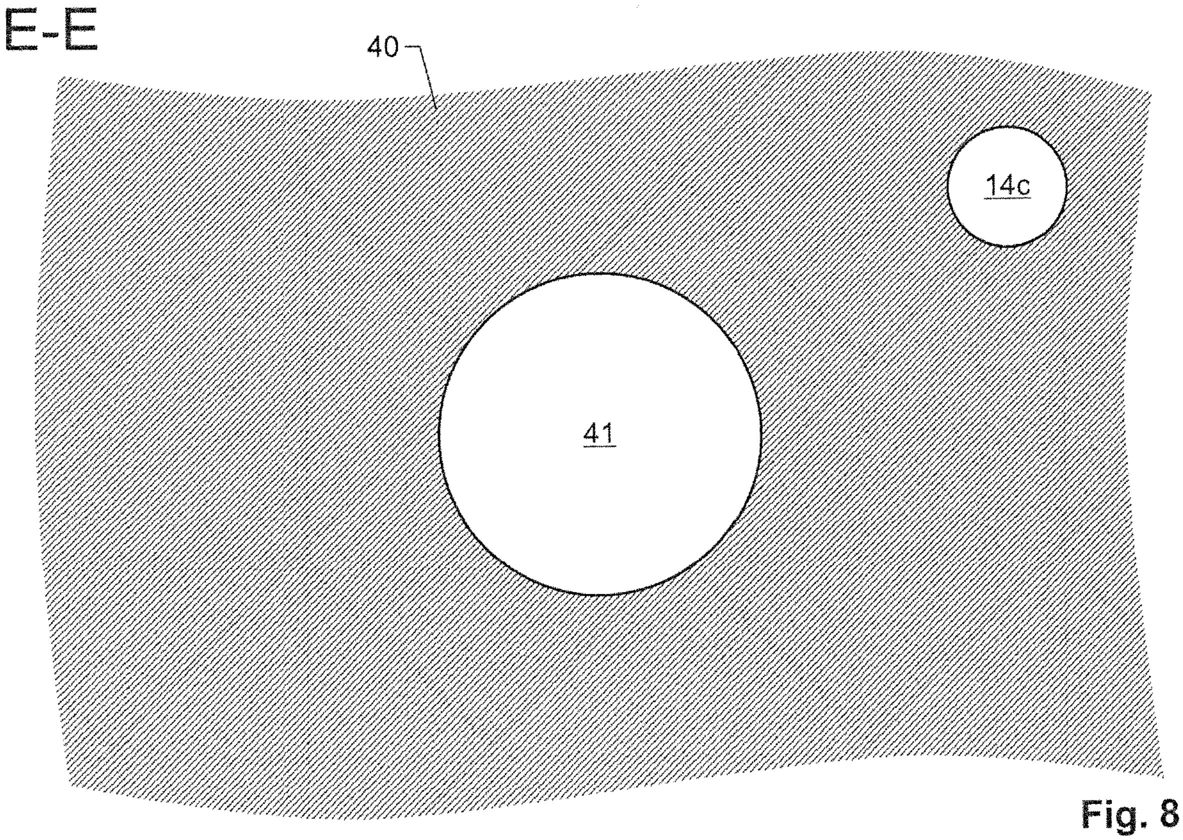
FIG. 8 is a horizontal sectional view along line E-E of FIG. 2.

Turning to FIGS. 2 and 8, a shielding electrode 40 may be located at the front side of and at a distance from the ejection electrodes 38, i.e. the ejection electrodes 38 are closer to nozzle carrier 6 than the shielding electrode 40. Advantageously, there is one continuous shielding electrode 40 extending over the front of print head 1, but there may also be several such shielding electrodes.

If several shielding electrodes are used, they may be applied to different potentials, e.g. by applying a voltage gradient by means of a voltage divider, which e.g. allows to gradually deflect the ink over a cross section of the print head.

Shielding electrode 40 is provided to control the field between print head 1 and target 2. For each nozzle 4, an opening 41 in shielding electrode 40 allows for the passage of the ink.

Figure 5:
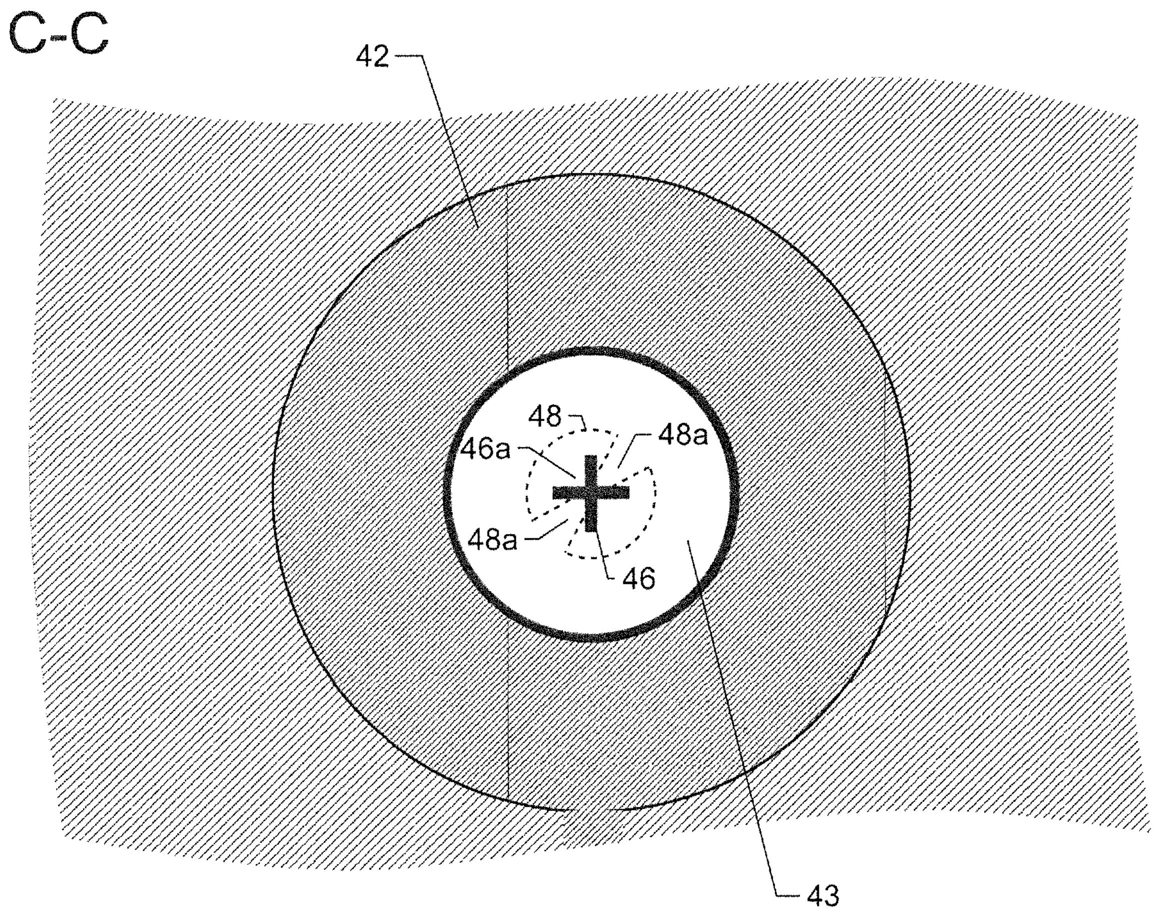
FIG. 5 is a horizontal sectional view along line C-C of FIG. 2.

As shown in FIGS. 2 and 5, a guard electrode 42 may be located behind and at a distance from ejection electrode 38 but in front of and at a distance from nozzle carrier 6. As shown in FIGS. 2 and 5, it may again be annular. Alternatively, it may also extend over several nozzles.

An opening 43 in guard electrode 42 above nozzle 4 allows for the passage of the ink.

The function of guard electrode 42 is described below.

Nozzle 4 of this embodiment comprises a tip section 46, a shaft section 48, and a base section 50, 52, with tip section 46 arranged in front of shaft section 48, and base section 50, 52 (FIGS. 2, 3) arranged behind shaft section 48.

The shown nozzle design relies on the ink wetting the lateral surface of nozzle 4 and not passing through a central channel of nozzle 4 (as it is e.g. known from WO 2016/169956), but the latter could be used as well.

If nozzle 4 has a central channel, e.g. if exit duct 60 extends all the way to the tip of the nozzle, the nozzle 4 is advantageously still operated such that ink not only wets the top of the nozzle but also its lateral outer sides. By making sure that ink covers the outside of all nozzles, all nozzles provide the same ink geometry to the ejection electrodes, which allows to achieve a more uniform ink ejection over the whole print head.

To facilitate a good flow of ink along nozzle 4 into ejection direction X, nozzle 4 advantageously has at least one groove running along ejection direction X on its lateral surface, i.e. on the surface extending along ejection direction X. This groove(s) run(s) along at least part of the length of nozzle 4.

This can e.g. be seen in FIG. 5, where tip section 46 is shown to be cross-shaped (with four recesses 46*a* formed between the arms of the cross), and where shaft section 48 forms two grooves 48*a*.

Figure 6:
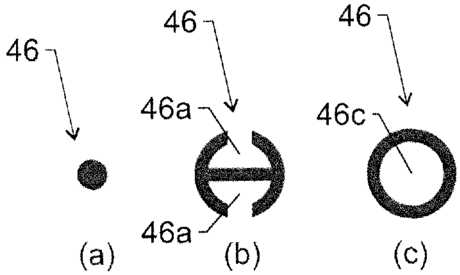
FIG. 6 shows some alternative nozzle tip designs in addition to the cross-shaped design of FIG. 5.

FIG. 6 shows alternative designs of tip section 46:

(a) is a tip section 46 that has a convex lateral surface and is e.g. a cylinder without a groove;

(b) is a tip section 46 that forms two lateral grooves 46*a;*

(c) is a tip section that forms an axial canal 46*c*.

Base section 50, 52 connects tip section 46 and shaft section 48 to nozzle carrier 6. It also contains the duct(s) for feeding ink to the nozzle. This is best seen in FIGS. 2, 3, and 4.

In particular, in the shown embodiment, base section 50, 52 comprises a bottom sublayer 52 and a top sublayer 50. Bottom sublayer 52 has a central opening 54 communicating with the end of a supply duct section 15*a* that feeds ink to nozzle 4. One or more radial transversal exit ducts 56 extend, transversally to ejection direction X, outwards from central opening 54 to a first annular duct 58.

In FIG. 2, the flow of the ink in the duct are depicted by arrows.

Top sublayer 50 may also form an axial exit duct 60 extending towards the tip of the nozzle and connecting supply duct section 15*a* to the grooves 48*a* (FIG. 5) of shaft section 48, thereby guiding ink directly up towards tip section 46.

Top sublayer 50 may be surrounded by a second annular duct 62 aligned with first annular duct 58 surrounding nozzle 4.

Nozzle 4 is surrounded by an ink retainer 66, whose purpose is to retain the ink laterally. Annular duct 62 is located, in radial direction, between ink retainer 66 and nozzle 4, thereby communicating with a region 64 between nozzle 4 and ink retainer 66.

The front surface 68 of ink retainer 66 (i.e. the front-facing surface closest to the ejection electrode 38) is set back, along ejection direction X, in respect to the front end 70 of nozzle 4. Hence, when there is ink in region 64, the surface of the ink forms an ascending slope, as shown by the dash-dotted lines, towards the tip of nozzle 4, making sure that the tip is the location where the ink is closest to ejection electrode 38, thereby forming a defined point to launch the ink from.

The main function of ink retainer 66 is to pin the ink, i.e. to keep the ink away from the vertical parts of support structure 8, i.e. to prevent it from climbing up and forming a pool that might submerge the nozzle.

This function is implemented by a combination of one or more of the following features:

a) Ink retainer 66 is provided with a hydrophobic and/or oleophobic surface, e.g. by a hydrophobic and/or oleophobic coating 73, shin with a thick, black line in FIG. 2. For example, the surface can be formed, at least in part, of Teflon and/or PTFE, which are hydrophobic and oleophobic. Depending on the scope of inks to be used, it may also be only hydrophobic (e.g. HMDS, i.e. Bis(trimethylsilyl)amine) or only be oleophobic (e.g. based on polymers). In particular, the surface of ink 66 retainer is advantageously more hydrophobic and/or oleophobic than a surface of nozzle 4.

b) Ink retainer 66 forms a ledge 66*a* facing away from the nozzle 4 closest to it, which makes it hard for the ink to creep around it. In other words, when seen from the nozzle, the ledge extends outwards, forming an "undercut" 66*b*.

c) Ink retainer 66 is located in a region where electric fields are low. Since strong electric fields tend to decrease the surface tension of the ink, this design reduces the risk of the ink wetting its way around the ink retainer. In the shown embodiment, the guard electrode 42 associated with nozzle 4 is arranged between ejection electrode 38 and ink retainer 66. In this context, "between" advantageously means that guard electrode 42 intersects, and advantageously divides in two, the volume of space between ejection electrode 38 and ink retainer 66.

It must be noted that ink retainer 66 is not the only means for retaining the ink laterally, i.e. for preventing the ink to reach the closest support element. Alternatively or in addition thereto, the ink suction ducts 16 may be used to remove any ink that might reach the support elements. This is described in more detail in the section Operating the Print Head.

Guard electrode 42 is connected to voltage supply 17, e.g. by means of vias 14' or 14, and it may be set, during operation, to a potential that is closer to the potential of ink retainer 66 (i.e. of the ink) than to the (maximum) potential of the ejection electrodes. In particular, voltage supply 17 may be adapted to keep guard electrode 42 at the same potential as ink retainer 66. This allows to keep the electrical field at ink retainer 66 very low.

As shown in FIG. 2, guard electrode 42 is advantageously arranged at the same "height" (with the vertical direction defined by the ejection direction X) as the front end 70 of nozzle 4, e.g. within an accuracy of 25% of the vertical distance d between ejection electrode 38 and the front end 70 of nozzle 4. This provides for a good shielding of the ink below the tip of nozzle 4 while still strongly exposing the tip to the field of ejection electrode 38.

As can be seen in FIG. 2, there is an air-filled cavity 71 forming a gap between guard electrode 42 and ink retainer 66, which prevents the ink from reaching guard electrode 42.

To laterally retain the ink in region 64, ink retainer 66 is advantageously arranged on the front side 36 of nozzle carrier 6 and projects from it. In the embodiment of FIGS. 2-4, it comprises a first ring 72 mounted to front surface 36 of nozzle carrier 6 and a second ring 74 mounted to the front side of first ring 72. Second ring 74 forms the ledge **66*a*** mentioned above.

Ink Suction

As mentioned above, in the embodiment of FIGS. 1 and 2, suction ducts 16 are provided to retrieve ink from the nozzles 4. This allows to maintain a flow of fresh ink at a given nozzle.

In that case, at a given nozzle, the closest ink retainer 66 advantageously surrounds not only nozzle 4 and the end section **15*a* of the supply duct but also the end of the end section 16*a* of suction duct 16**. Hence, the two ducts can be used to control the flow of ink towards a nozzle and back from it.

The pressure at the supply ducts 15 and the suction ducts 16 is adjusted to keep the ink in region 64 somewhere e.g. between an upper level **64*a* and a lower level 64*b* as shown in FIG. 2. Advantageously, and as described in more detail in the section "Operating the Print Head" below, the ink is kept at the lower level 64*b***.

For a good lateral restriction of the ink, each nozzle 4 is advantageously surrounded by the opening or openings of one or more suction ducts. This may e.g. be a single annular opening (such as formed by annular opening 62 of FIG. 2), or it may be an annular series of suction openings. This opening or these openings is/are arranged between the nozzle and the support elements 78 next to it.

Support Structure

As mentioned, a support structure 8 is provided for connecting the various electrodes 38, 40, 42 to nozzle carrier 6. It is arranged on front side 36 of nozzle carrier 6.

Support structure 8 comprises a plurality of support elements 76, 78 arranged between the nozzles 4.

Ink retainer 66 is advantageously designed to prevent ink from reaching these support elements 76, 78 and to prevent it from wetting them, thereby reducing the tendency of the ink to submerge the nozzles.

Support structure 8 advantageously comprises at least one electrode carrier layer. In the embodiment of FIG. 2, there are three such layers 80, 82, 84. Each such electrode carrier layer comprises at least one electrode 38, 40, 42 and may extend parallel to top surface 36.

Typically, the electrode 38, 40, 42 is embedded within its electrode carrier layer 80, 82, 84 and covered on its front and back side by at least one dielectric sublayer **80*a*, 80*b* or 82*a*, 82*b* or 84*a*, 84*b***.

At least part of the support elements are formed by vertical walls 76 forming a honeycomb structure, see FIG. 3. Each such honeycomb structure is part of a multilayer structure which is used in various parts of the print head and is described in more details below.

In addition or alternatively to the walls 76 forming honeycomb structures, the support elements comprise, in the shown embodiment, a vertical wall 78 surrounding exit passage 5 of each nozzle 4. Wall 78 may e.g. be a cylindrical wall, but it may also e.g. be polygonal. It is advantageously centered on nozzle 4.

In another embodiment, walls 78 may also be dispensed with, and the walls around exit passage 5 may be formed by the walls 76 of the honeycomb structure. In this case, the honeycomb structure needs to be aligned with the nozzles.

In yet another embodiment, several nozzles may be surrounded by a single wall 78.

In the embodiment shown here, the support elements 76 and/or 78 are provided between each of the electrode carrier layers 80, 82, 84 as well as between the backmost electrode carrier layer **80*a* and nozzle carrier 6**. They may, however, also only be provided between a subset of these structures.

As can best be seen from FIG. 2, there is a first recess located between nozzle 4 and its ink retainer 66, which is formed by the annular first and second annular duct 58, 62. It provides a volume to receive at least part of ink pool 64. Along ejection direction X, the bottom of first recess 58, 62 is at the back in respect to (i.e. is closer to nozzle carrier 6 than) the front surface 68 of ink retainer 66.

In the shown embodiment, there is a second recess 86 located between ink retainer 66 and the closest support element 78. It provides room for ledge **66*a* and/or makes it harder for the ink to reach support element 78. Along ejection direction X, the bottom of recess 86 is at the back in respect to (i.e. is closer to nozzle carrier 6 than) the front surface 68 of ink retainer 66**.

Nozzle Design 2

Figure 9:
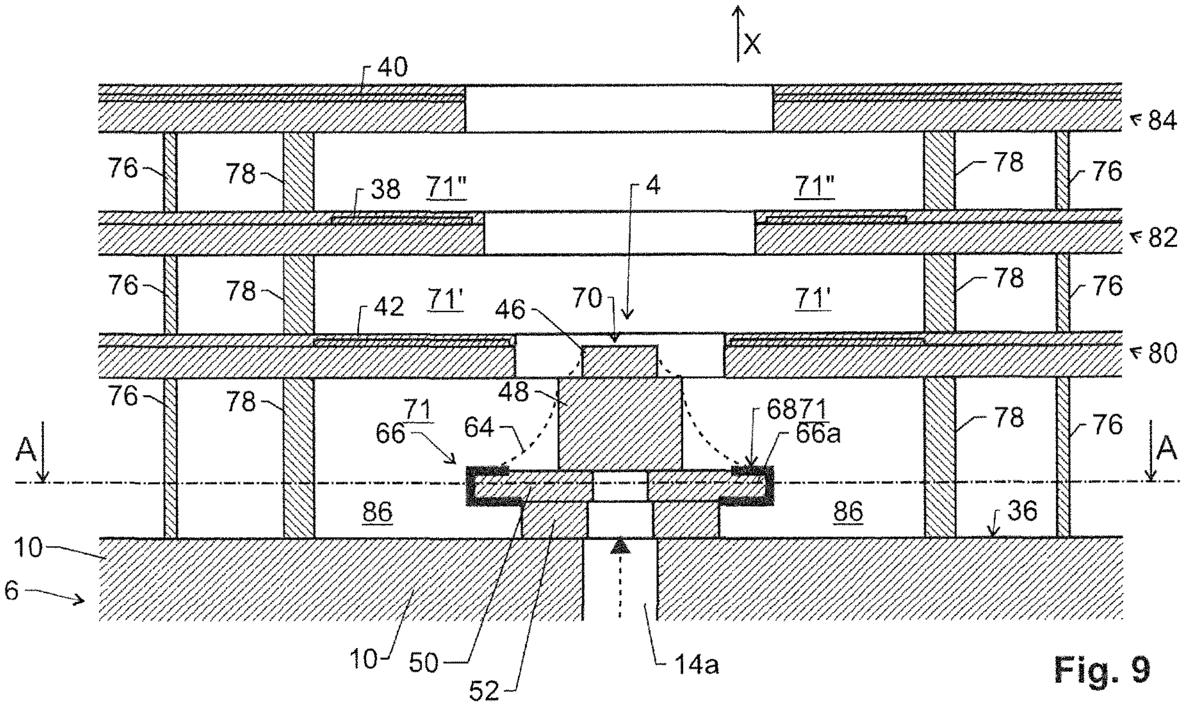
FIG. 9 is a vertical sectional view through a second embodiment of a nozzle.
Figure 10:
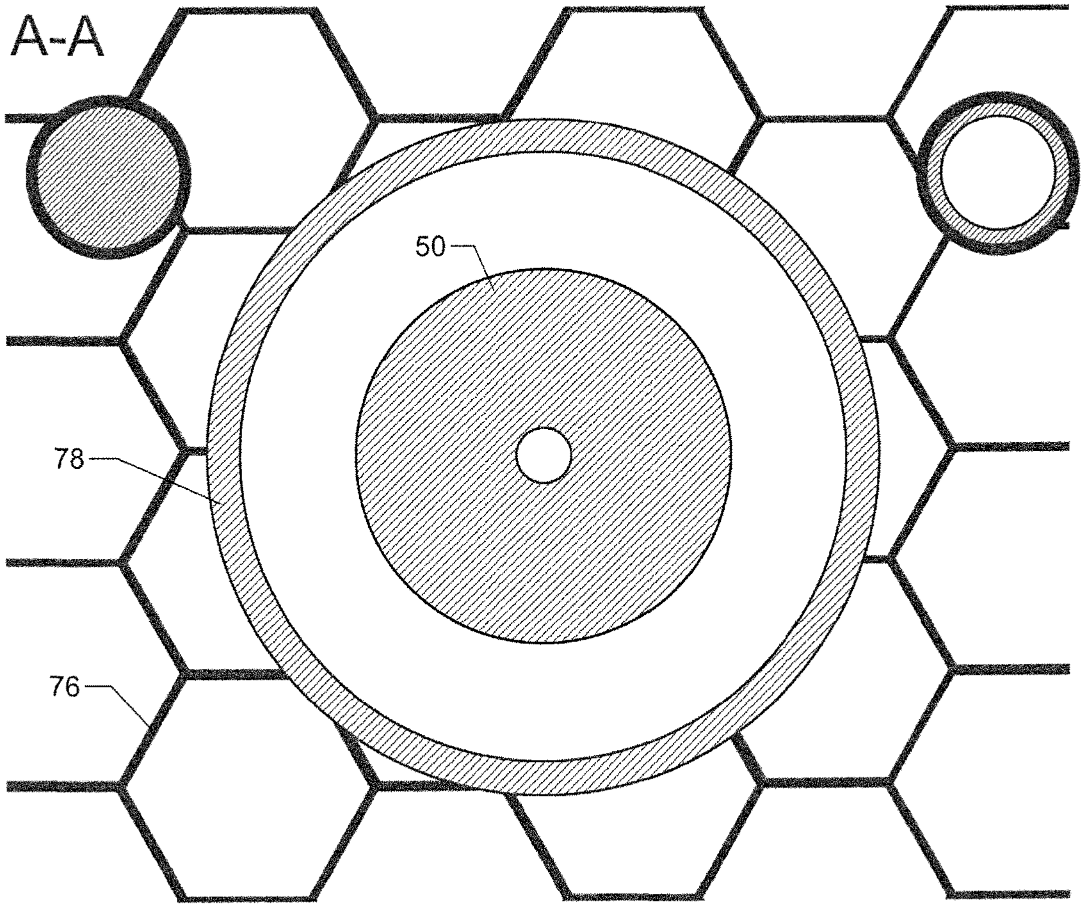
FIG. 10 is a horizontal sectional view along line A-A of FIG. 9.

FIGS. 9 and 10 show a second embodiment of a nozzle design. It primarily differs from the first one in that there is only an ink supply duct 15 (with its end section **15*a* shown in FIG. 10**) but no suction duct for the nozzle.

Further, there is no recess between nozzle 4 and ink retainer 66. Rather, ink retainer 66 is laterally arranged on nozzle 4 with its front surface 68 at a distance from front end (tip) 70 of nozzle 4.

In other words, its front surface 68 is set back with respect to front end 70 of nozzle 4 in order to form an ascending slope for the ink in region 64 and reducing the risk of submerging the nozzle.

Advantageously, ink retainer 66 is mounted "low" on the nozzle 4 to make submerging the nozzle less probable. In particular, front surface 68 of ink retainer 66 is closer to the front size 36 of nozzle carrier 6 than to front end 70 of nozzle 4.

As can be seen, in this embodiment, ink retainer 66 is formed by the sublayer 52 of the base section of nozzle 4.

Nozzle Design 3

Figure 11:
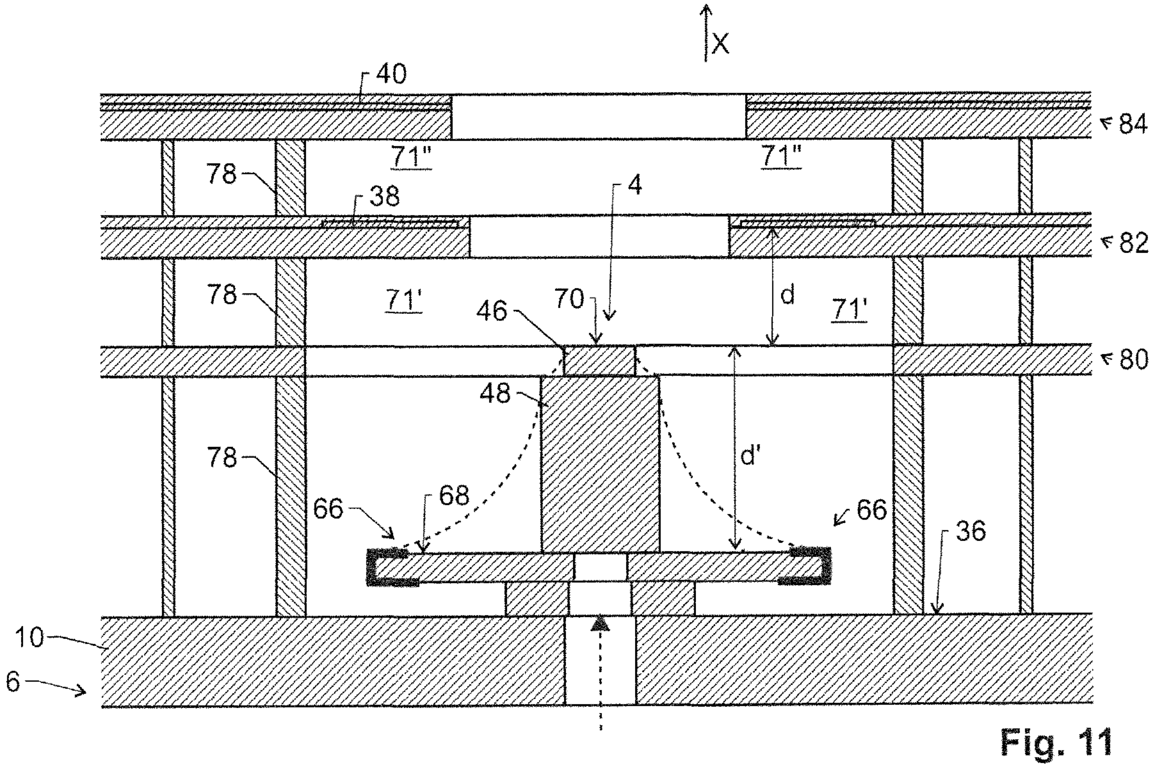
FIG. 11 is a vertical sectional view through a third embodiment of a nozzle.

FIG. 11 shows a third embodiment of a nozzle design. It primarily differs from the second one in that it has no guard electrode. To keep the electrical field at the location of ink retainer 66 low, ink retainer 66 is located far back.

In particular, as shown in FIG. 11, the distance d', along ejection direction X, between front surface 68 of ink retainer 66 and front end 70 of nozzle 4 is large.

Quantitatively, if d designates the distance, along ejection direction X, between ejection electrode 38 and the front end 70 of nozzle 4, the following condition is advantageously maintained:

$$d' > k \cdot d$$

with k being at least 0.5, in particular at least 1.0.

Nozzle Design without Ink Retainer

Figure 21:
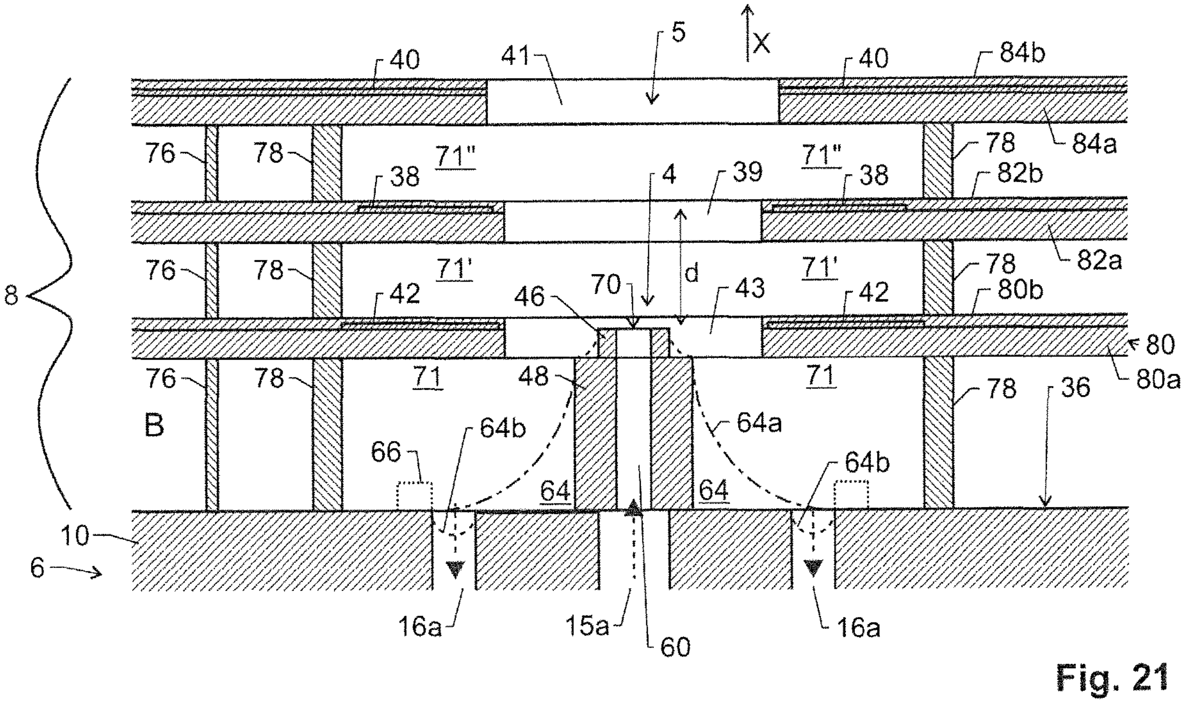
FIG. 21 is a vertical section view of an embodiment without ink retainer.

In the embodiments shown so far, nozzle 4 was surrounded by the ink retainer 66 that projects up from top surface 36 of nozzle carrier 6. However, using ink suction allows to dispense with such an ink retainer. This is illustrated in FIG. 21, which shows an embodiment basically corresponding to the one of FIG. 2 but without an ink retainer. Hence, the layers forming the base sections 50, 52 of the embodiment of FIG. 2 may be dispensed with.

In this embodiment, the ink is retained around nozzle 4 by being sucked into the end section(s) 16*a* of ink suction ducts 16 that surround the nozzle.

In one embodiment, a single, annular (or e.g. hexagonal or otherwise closed-loop) end section 16*a* of the suction ducts 16 may be arranged around nozzle 4.

In another embodiment, a plurality of individual end sections 16*a* may be provided, closely spaced and surrounding nozzle 4, e.g. arranged along a circle or another closed loop.

In this embodiment, guard electrode 42 may still be useful because it reduces the tendency of the ink to spread along surface 36 of nozzle carrier 6.

In the embodiment shown, exit duct 60 extends all the way to the top 70 of the nozzle. Hence, ink flows axially through the nozzle. Advantageously, the pressure in exit duct 60 is selected such that the ink overflows the nozzle and flows down along its lateral side walls. From there, it arrives at the end section(s) 16*a* of the suction ducts 16 and is carried off. This provides for a continuous ink exchange in the nozzle.

In another embodiment, the ink may be guided up along the outer surface of the nozzles, e.g. in grooves as shown in the embodiment of FIGS. 2-5, and the ink can be suctioned off from the end section 16*a*, e.g. through an axial opening in the nozzle.

Optionally, however, the designs of this section may also be combined with e.g. a simple ink retainer 66 (as indicated in dotted lines) surrounding the end section(s) 16*a* of the suction ducts 16.

Nozzle Carrier

Figure 12:
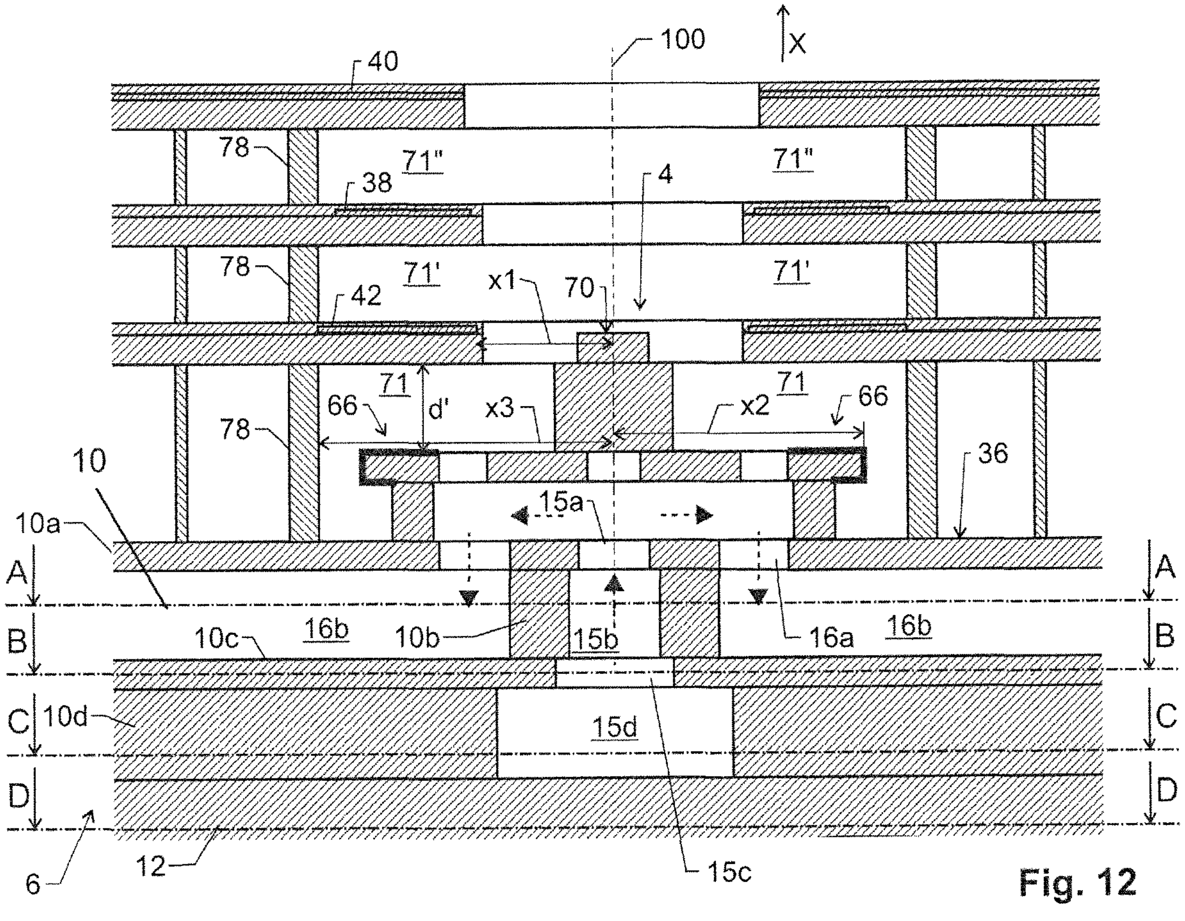
FIG. 12 is a vertical sectional view through a fourth embodiment of a nozzle, which basically corresponds to the first embodiment but illustrates the design of the nozzle support.
Figure 13:
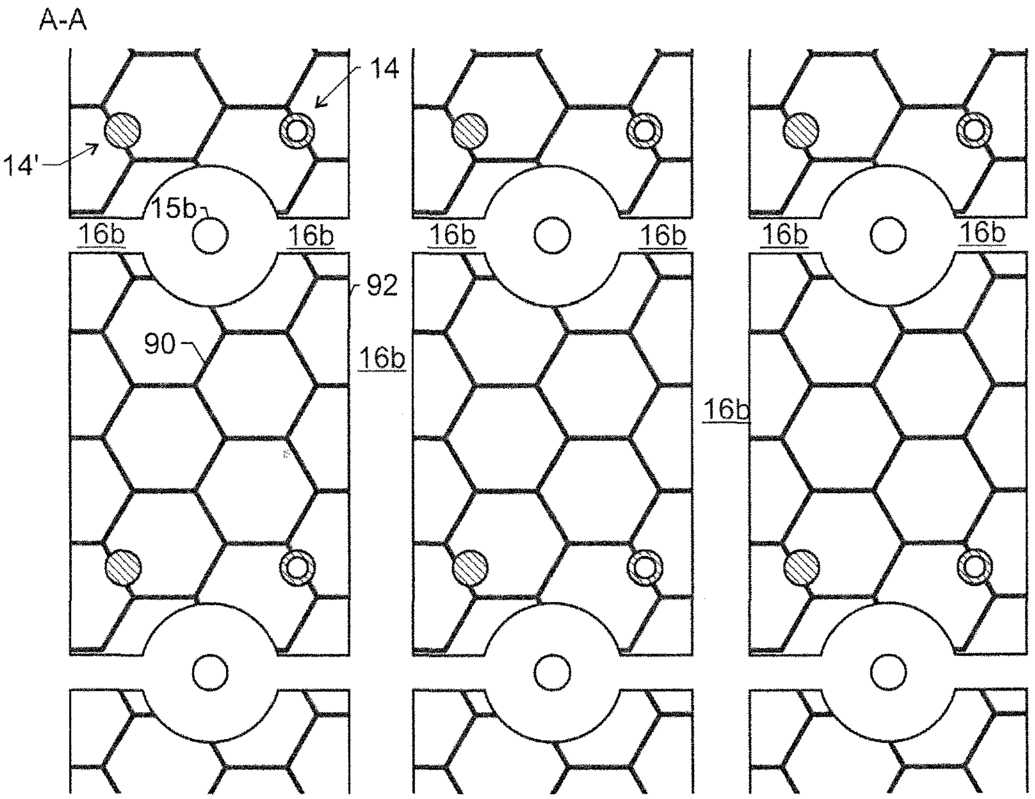
FIG. 13 is a horizontal sectional view along line A-A of FIG. 12.
Figure 14:
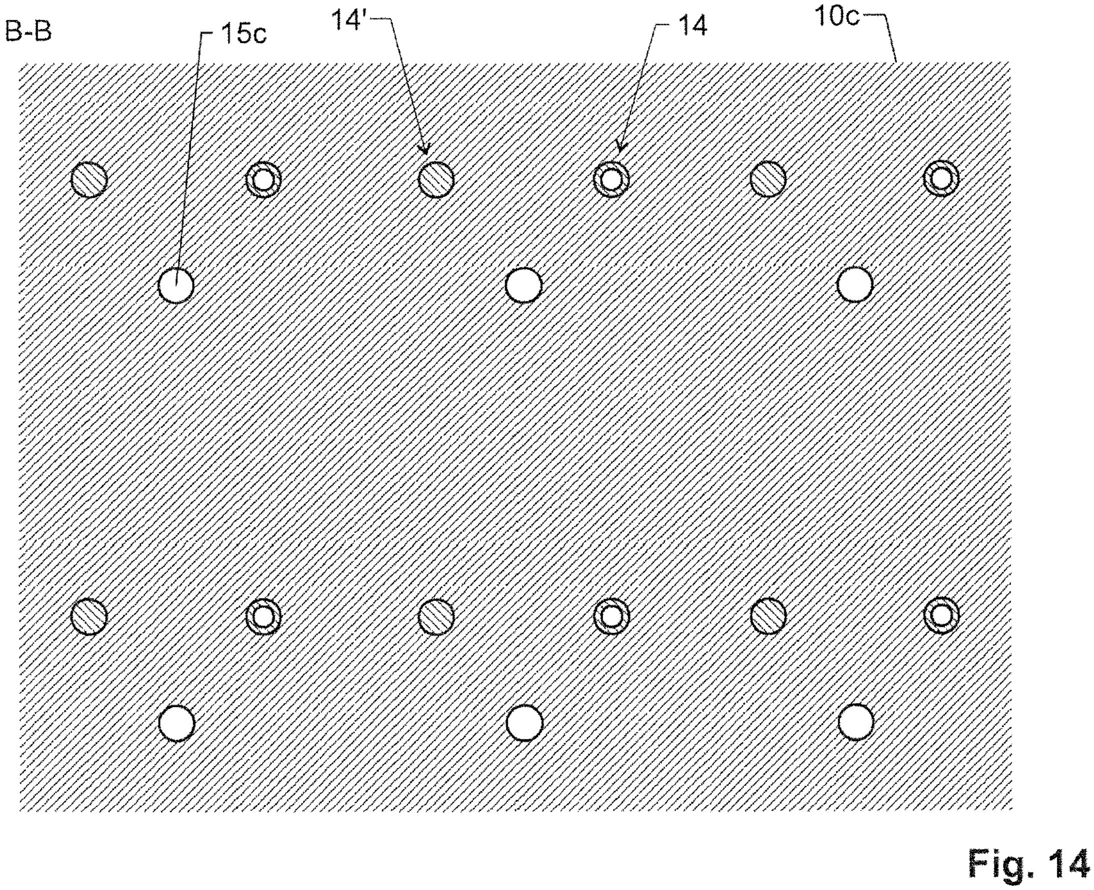
FIG. 14 is a horizontal sectional view along line B-B of FIG. 12.
Figure 15:
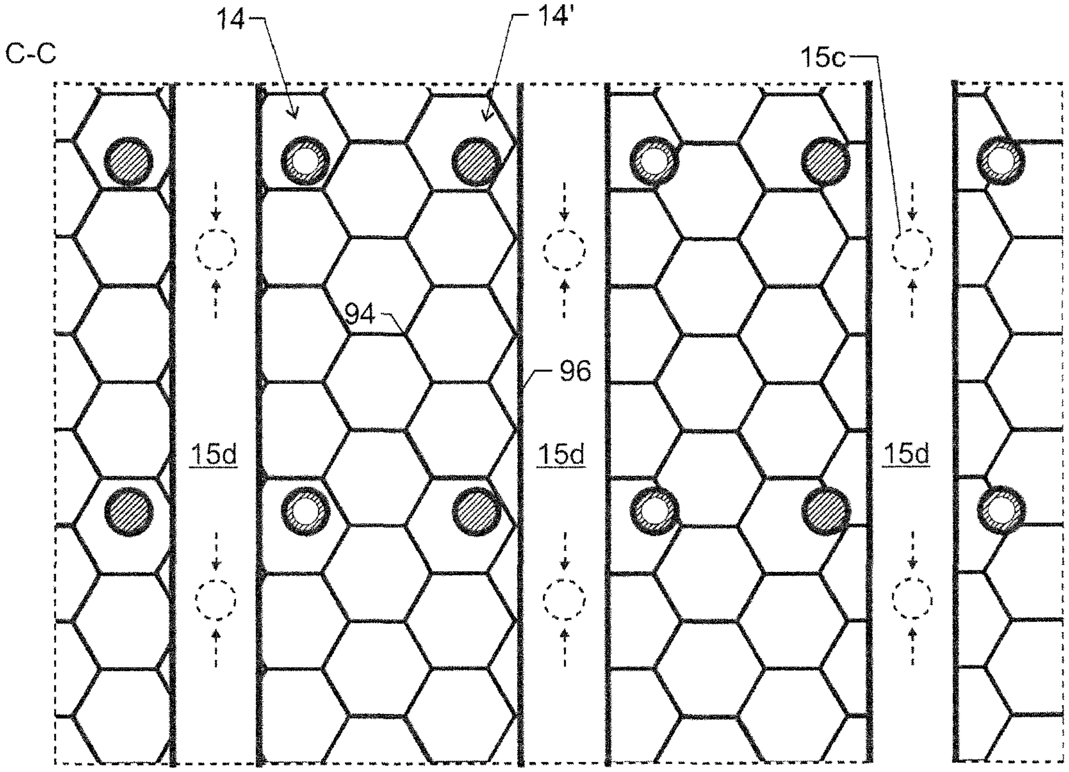
FIG. 15 is a horizontal sectional view along line C-C of FIG. 12.
Figure 16:
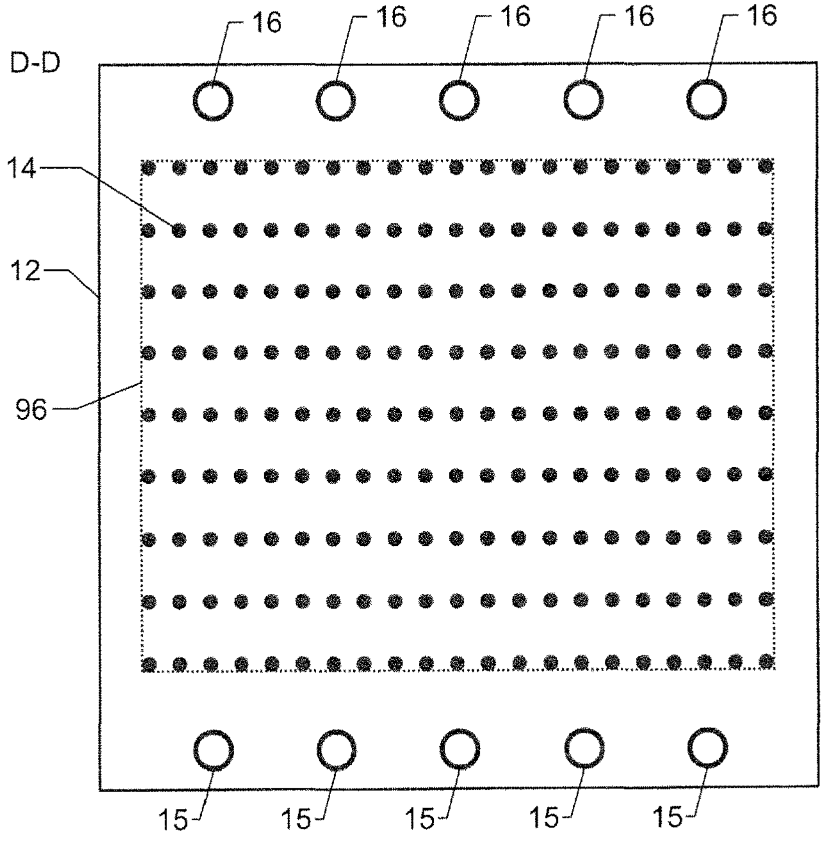
FIG. 16 is a horizontal sectional view along line D-D of FIG. 12.

FIGS. 12-16 show a possible design of nozzle carrier 6. It is to be noted that FIGS. 13-15 are at a reduced scale as compared to FIG. 12 in order to illustrate how neighboring nozzles may be interconnected by supply ducts and suction ducts, and FIG. 16 is shown at an even more reduced scale illustrating a whole cross section of the print head at the level of backing layer 12.

These figures show the nozzle of FIG. 2, but similar nozzle carriers can be used for different nozzle designs, such as for the designs of FIGS. 9 and 11.

As mentioned above, nozzle carrier 6 comprises a front layer 10, with the nozzles 4 being mounted to the front side 36 thereof, as well as a backing layer 12 located at the back side of front layer 10. Front layer 10 as well as backing layer 12 may in turn be multi-layer-structures.

They are described in more detail in the following.

Front layer 10 consists of several sublayers 10*a*-10*d* and forms at is least part of the ducts 15, 16 for feeding ink to and, where applicable, from the nozzles.

In the embodiment of FIG. 12, front layer 10 comprises, in front-to-back order, sublayers 10*a*, 10*b*, 10*c*, and 10*d* for forming the ducts.

Sublayer 10*a* forms front surface 10*a* and comprises openings 15*a*, 16*a* for the supply ducts and (if needed) the suction ducts, respectively.

Sublayer 10*b* forms (if needed) horizontal sections 16*b* of the suction ducts as well as vertical sections 15*b* of the supply ducts.

As best seen in FIG. 13, the horizontal sections 16*b* of the suction ducts interconnect all or at least a plurality of the nozzles 4. In addition, between the ducts, sublayer 10*b* comprises vertical walls 90 forming honeycomb patterns similar to the ones in support structure 8. The regions of the honeycomb patterns may be separated from the ducts 16*b* and/or 15*b* by means of vertical separating walls 92.

FIG. 13 also shows the vias 14, 14' extending along ejection direction X through all of front layer 10.

The vertical sections 15*b* of the supply ducts are connected to vertical sections 15*c* of the supply ducts in sublayer 10*c*, see FIG. 14.

As shown in FIG. 15, sublayer 10*d* forms horizontal sections 15*d* of the supply ducts, interconnecting neighboring nozzles.

Again, sublayer 10*d* may comprise vertical walls 94 forming honeycomb patterns similar to the ones in support structure 8. The regions of the honeycomb patterns may be separated from the ducts 10*d* by means of vertical separating walls 96.

FIG. 15 also shows the vias 14, 14' extending along ejection direction X through all of front layer 10.

FIG. 16 shows a possible arrangement of electrical vias 14 (and 14'), the supply ducts 15 and the suction ducts 16 at the level of backing layer 12. Since the horizontal distribution of the ink ducts 14, 16 is implemented in front layer 10 above backing layer 12, the ink can be fed through one or a few, potentially large ink ducts arranged outside the convex hull 96 of the regular array of electrical vias 14, which simplifies the design of backing layer 12, i.e. no ink ducts extend through the backing layer 12 within the convex hull 96.

Instead of using a honeycomb structures in the sublayers 10*b* and/or 10*d*, solid layers may be used, e.g. of glass.

Honeycomb Multilayer Structures

Figure 18:
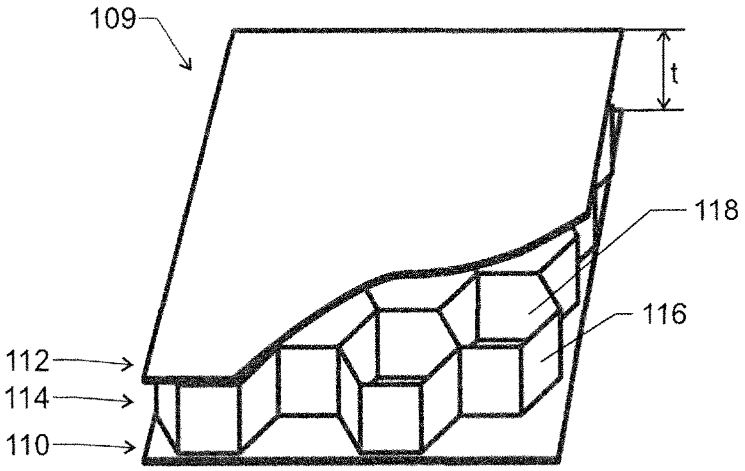
FIG. 18 illustrates a multilayer honeycomb structure.
Figure 19:
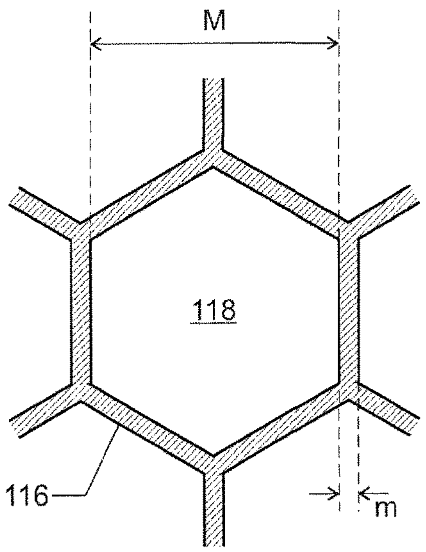
FIG. 19 shows a design of the walls of the intermediate layer.

As follows from the above, the print head shown here advantageously uses one or more honeycomb multilayer structures. One such multilayer structure 109 is illustrated in FIGS. 18, 19. It has a bottom layer 110, a top layer 112, and at least one intermediate layer 114 between bottom layer 110 and top layer 102. Intermediate layer 114 forms walls 116 extending between bottom layer 110 and top layer 112. These walls form at least part of the walls of a plurality of cavities 118 in the intermediate layer 114 between bottom layer 110 and top layer 112.

The walls 114 advantageously form a honeycomb pattern.

Such a structure is found to reduce mechanical stress, in particular if the bottom or top layer 110, 112 is of a material different from intermediate layer 114 and/or if it is located close to or adjacent to another layer that is of a material different from intermediate layer 114.

Examples of such honeycomb multilayer structures in the examples above are the following:

- In FIGS. 2, 11, 12: Front layer 10 or sublayer 10*a* is the "bottom layer" 110, layer 80 of support structure 8 is the "top layer" 112, and the walls 76 between them form the "intermediate layer" 114.
- In FIGS. 2, 11, 12: Layer 80 of support structure is the "bottom layer" 110, layer 82 of support structure 8 is the "top layer" 112, and the walls 76 between them form the "intermediate layer" 114.
- In FIGS. 2, 11, 12: Layer 82 of support structure is the "bottom layer" 110, layer 84 of support structure 8 is the "top layer" 102, and the walls 76 between them form the "intermediate layer" 114.
- In FIGS. 12, 13: Sublayer 10*c* is the "bottom layer" 110, sublayer 10*a* is the "top layer" 112, and the walls 90 of sublayer 10*b* between them form the "intermediate layer" 114.
- In FIGS. 12, 15: Backing layer 12 is the "bottom layer" 110, sublayer 10*c* is the "top layer" 112, and the walls 94 of sublayer 10*d* between them form the "intermediate layer" 114.

In the first three examples, support structure 8 comprises at least the intermediate layer 114 of the multilayer structure.

In the last two examples, nozzle carrier 6 comprises at least the intermediate layer 114 of the multilayer structure.

If the thickness t of intermediate layer 114 (see FIG. 18) is comparatively large, the stress reduction achieved by the multilayer structure is particularly evident. Advantageously, the thickness t is larger than 1 μm, in particular larger than 10 μm.

Advantageously, intermediate layer 114 is a polymer layer, e.g. formed from an SU-8 layer after structuring. This type of layer can be manufactured and structured easily (see manufacturing information below), and if using it in a multilayer structure as shown reduces the stress as to compared to a solid layer of such a material.

Hence, advantageously, the print head comprises at least one layer of a material different from the intermediate layer, in particular a layer of semiconductor or glass.

The cavities 118 are advantageously closed cavities, i.e. they do not form part of the ink duct sections 15*b* or 16*d* in FIGS. 15 and 13 nor do they communicate with the surrounding atmosphere.

If the walls 116 form a regular, repetitive pattern, homogeneity is improved and stress can further be decreased.

Advantageously, the walls 116 have a thickness m of less than 25% of the minimum diameter M of the cavities (see FIG. 19). This leads to a low content of solid material in the intermediate layer, further reducing mechanical stress. In this context, the thickness m is the extension of the walls 116 perpendicular to their surfaces. The diameter M of the cavities is the extension of the cavities 118 in a direction parallel to the bottom and top layers 110, 114.

For best strain removal, the minimum diameter M of the cavities 118 is advantageously larger than the thickness t of intermediate layer 114, i.e. M>t. Smaller cavities extending through intermediate layer 114 would generate higher mechanical stress in the intermediate layer.

The walls 116 extend advantageously perpendicular to bottom layer 110 and the top layer 112. This not only improves the mechanical stability against forces acting perpendicularly to the layers, but it also allows to form the walls by anisotropic material removal techniques, particularly by photolithography of a photo-active polymer.

It must be noted that the top layer and the bottom layer of the multilayer structures are parallel to each other.

The closed cavities 118 do not communicate with the ink ducts, i.e. they are not used for guiding ink through the print head. If the print head has ventilation ducts, the closed cavities 118 do not communicate with these ventilation ducts either.

The closed cavities 118 may be filled with air. Alternatively, they may be evacuated. Or they may be filled with a gas such as nitrogen. Advantageously, they may be filled with a gas having a high breakdown voltage, such as $SF_6$ or $C_4F_8$. The gas can be introduced by performing the respective manufacturing step (see below) in a workspace having the desired gas composition.

Electrode Design

The print head is designed to withstand the high electric fields that occur during operation with minimum structural damage.

For this purpose, the electrodes 38, 40, 42 are arranged between solid dielectric layers 80*a*, 80*b*, 82*a*, 82*b*, 84*a*, 84*b* that border cavities. In the shown embodiments, such cavities are e.g. formed by the cavities 71, 71', 71" below the electrode carrier layer 80, 82, 84 and/or by the cavities 118 formed by the walls 116.

At least some of the cavities may be closed cavities (i.e. enclosed by walls on all sides, such as the cavities 118).

At least some of the cavities may be open cavities, in particular cavities communicating with and being adjacent to exit passage 5 of nozzle 4, such as the cavities 71, 71', 71" of the embodiments above.

In such a design, the solid dielectric layers around the electrodes typically are able to withstand higher fields than the gas in the cavities and also have higher relative permittivity e, and they therefore prevent a total breakdown. At the same time, since there is no fixed molecular or atomic structure within the cavities, the cavities are not prone to permanent damage caused by large electric fields. Hence, this design improves the ability of the print head to withstand the effects of the electrical fields of the electrodes even during long periods of operation.

As can be seen in the embodiments shown here, there are solid support structures extending vertically between the neighboring electrode carrier layers 80, 82, 84, e.g. the walls 76 and 78. However, there are advantageously no such solid support structures extending directly between neighboring electrodes. In other words, any straight line extending between two neighboring electrodes extends through at least one of the cavities 71, 71', 71" or 118. This condition should be met for some or, in particular, all neighboring electrodes of the print head if they carry, in operation, substantially different potentials, in particular differing by a voltage of at least 100 V.

This condition may be fulfilled by not placing solid support structures to extend vertically between the electrodes and/or by locally removing sections of the support structures, e.g. at the location of contact lead 38*b* in FIG. 7.

In yet another embodiment, the field strength may be reduced by designing the electrical tracks to be very narrow at locations where no cavity between the electrodes is provided. In that case, the tracks are advantageously be no more than half as wide as the height of the wall structures 76, 78. If, for example, the wall structures have a height of 5 μm, the tracks should not be wider than 2.5 μm.

Advantageously, the lateral offset between an electrode and the next (i.e. closest) support structure should, for at least one of the two neighboring electrodes, be at least 25% of the vertical distance between the two neighboring electrodes.

Advantageously, at least one of the dielectric layers protecting the electrodes has high relative permittivity c. Thus, the field within it is weak, with the major voltage drops being shifted to the layers of lower permittivity and in particular to the cavities. This allows to even better protect the structure from an electrical breakdown.

In this context, a high relative permittivity ε is advantageously at least 5. Suitable materials are e.g. $Si_3N_4$ (with a relative permittivity ε between 9.5 and 10.5) or $Al_2O_3$ (with ε between 9.3 and 11.5).

Figure 20:
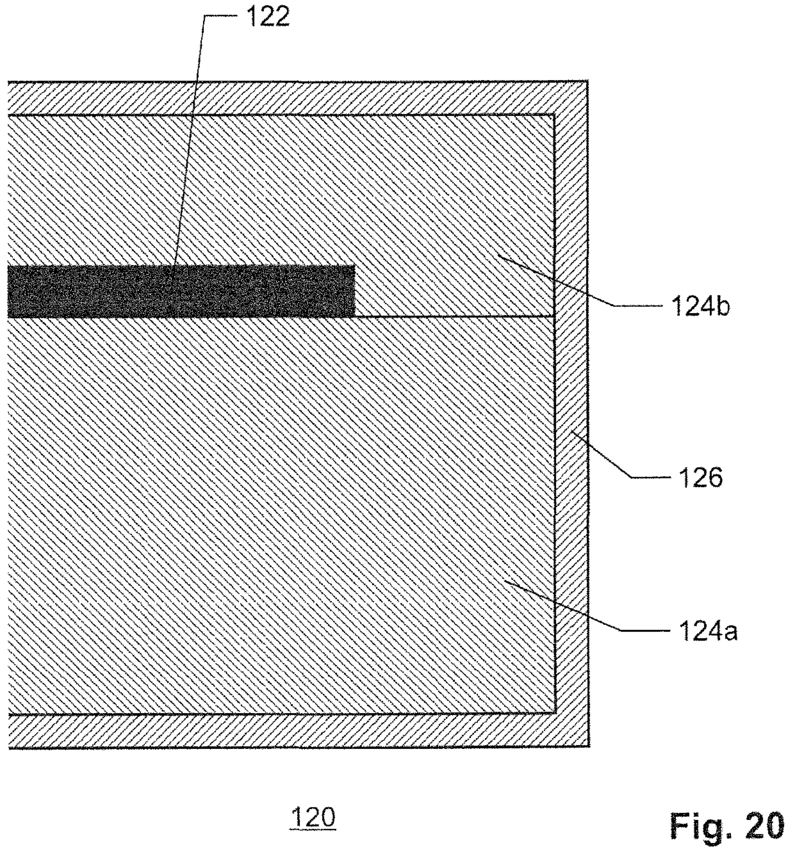
FIG. 20 shows a vertical sectional view of an electrode with an embodiment of the dielectric layers surrounding it.

Advantageously, as shown in FIG. 20, several dielectric layers are provided between the cavity 120 and the electrode 122. (With cavity 120 of FIG. 20 e.g. representing the cavities 118 or 71, 71', 71" of the examples above and electrode 122 representing one of the electrodes 38, 40, 42 in the examples above, in particular ejection electrode 38.

In the shown embodiment, electrode 122 is enclosed by a first dielectric layer 124*a*, 124*b*, which is in turn enclosed by a second dielectric layer 126.

First dielectric layer 124*a*, 124*b* is advantageously a polymer layer, e.g. consisting of patterned SU-8 (see manufacturing process below). Such a polymer layer has a low relative permittivity, e.g. between 2.5 and 3.0. It corresponds e.g. to the sublayers 80*a*, 80*b*, 82*a*, 82*b*, 84*a*, 84*b* of the electrode carrier layer 80, 82, 84 described above and may, at least in part, be manufactured using lamination techniques (see below).

Second dielectric layer 126 is an inorganic layer with a higher electric breakdown threshold than first dielectric layer 124*a*, 124*b*. It advantageously has a higher relative permittivity than first dielectric layer 124*a*, 124*b*, in particular by a factor 2. It may e.g. be of $Si_3N_4$ or $Al_2O_3$ for the reasons mentioned above. It has the highest breakdown resistance of all components between two electrodes and typically prevents an electric breakdown.

Placing first dielectric layer 124*a*, 124*b* between electrode 122 and second dielectric layer 126 has the advantage that the peak field strengths e.g. at edges of electrode 122 are within the first dielectric layer, thus increasing the ability of second dielectric layer 126 to prevent a breakdown.

Hence, in an advantageous embodiment, at least some of the cavities 120 are arranged between different electrodes of the print head or between an electrode of the print head and an ink retainer 66 of the print head.

Advantageously, the different electrodes 38, 40, 42, 122 are separated from the cavity or cavities 120 by one or more solid dielectric layers 124*a*, 124*b*, 126.

In particular, the one or more solid dielectric layers 124*a*, 124*b*, 126 advantageously comprise a polymer layer 124*a*, 124 and/or an inorganic layer 126. Advantageously, the polymer layer 124*a*, 124 is arranged between electrode 122 and inorganic layer 126.

Operating the Print Head

In operation, i.e. while printing, ink is fed to the print heads by means of the supply ducts 15. This ink is restricted to region 64 between the nozzles 4 and the ink retainers 66.

To eject ink drops, the voltage at the desired ejection electrode(s) (in respect to the voltage of the ink) is increased temporarily. For example, a voltage pulse of 400 V may be generated. While not printing, the voltage at the ejection electrodes is maintained at a level where no ink is ejected. Advantageously, it is non-zero, though, e.g. at 200 V.

As mentioned above, the electric field at ink retainer 66 is advantageously kept low, e.g. at less than 50%, in particular at less than 10%, of the field strength at the forward end 70 of the nozzle. Since high electric field strengths reduce the surface tension of the ink, this procedure reduces the tendency of the ink to wet the ink retainer and to cross it.

The suction ducts 16, if present, are used to retrieve ink from the nozzles. Advantageously, the method for printing comprises the following steps:

- Using the supply ducts 15 in nozzle carrier 6 to individually feed ink to the nozzles and
- Using suction ducts 16 in nozzle carrier 6 to individually suck ink from the nozzles.

This allows to maintain the reservoir of fresh ink at the nozzles.

In operation, the pressure px at the end of the suction duct 16 at a given nozzle is advantageously maintained to keep the ink away from ink retainer 66, such as at the level 64*b* of FIG. 2. Advantageously, px should not be too low to prevent air from being sucked into suction duct 16. A suitable pressure can be calculated from the radial width w of annular duct 62. For w=5 μm and an ink with the surface tension of water, the Young Laplace equation yields a pressure difference dp of 144 mbar. For a liquid with the surface tension of alkane, the pressure difference dp would be 40 mbar. Hence, by keeping the pressure px at no more than dp below ambient pressure, surface 64*b* can be maintained and no air will be aspirated.

If, instead of an annular duct 62, several circular openings of a diameter of e.g. 5 μm are used, dp will be twice as large.

If the difference between the ambient pressure and px is less than dp, the level of liquid will rise, e.g. to line 64*a* of FIG. 2. There, the curvature is much lower than at line 64*b*. If we assume, in a simplified example, the curvature is ten times lower, the corresponding pressure difference is 14 mbar (for water). Hence, by e.g. maintaining pressure px at 50 mbar below atmosphere, ink can be prevented from reaching a level as high as line 64*a*.

On the other hand, the pressure py at the end of supply duct 15 at a given nozzle can be adjusted to maintain a desired ink flow through the nozzle. Also, and as mentioned above, the ink flow through the exit ducts 56 and 60 can be adjusted by choosing suitable diameters in these ducts.

In yet another embodiment, the pressure difference (below ambient pressure) in the end sections 16*a* of the suction ducts 16 can be chosen to be larger than dp at the lower level 64*b*. Hence, air will be aspirated into the suction ducts 16.

If, in that case, the ink returning through the suction ducts 16 is to be recycled, a separation device may be used to separate ink and air before the ink is fed to recirculation pump 18.

Manufacturing

The present print head can be manufactured using techniques as they are e.g. knows from semiconductor manufacturing and packaging, e.g. as described in WO 2013/000558, WO 2016/120381, and WO 2016/169956.

Advantageously, at least some of the layers of the print head are polymer layers, in particular the intermediate layers 114 of the multilayer structures of the type of FIGS. 18, 19 used therein.

Manufacturing such a multilayer structure comprises, advantageously, the following steps:

1. Providing bottom layer 110. This may e.g. be the top layer formed by a previous manufacturing step.
2. Applying a material layer on top of bottom layer 110. This material layer will form intermediate layer 114.
3. Applying top layer 112 above the material layer.

The material layers deposited in steps 2 and 3 may be applied using various techniques, such as lamination, spin coating, sputtering, or vapor deposition.

Lamination is particularly advantageous, in particular for applying the top layer 112. In lamination, the layer is applied as a sheet material and connected to the underlying structure e.g. using heat and pressure. This allows to easily span the cavities and/or to create overhanging structures.

The material layer of step 2 is advantageously a photoresist, such as SU-8, which allows to structure it easily. In this case, step 2 comprises at least the following sub-steps:

2a: Illuminating the material layer with collimated light through a mask, thereby defining illuminated and non-illuminated regions in the material layer.

2b: Selectively removing the illuminated or the non-illuminated regions from the material layer, depending on if a positive or negative photoresist is used.

Alternatively, top layer 112 may also be formed from a solid material, e.g. a glass wafer, that is bonded to the intermediate layer 114, e.g. by adhesive bonding, fusion bonding, eutectic bonding, etc.

Inorganic dielectric layer 126 (FIG. 20) can e.g. be manufactured by depositing it onto the polymer dielectric layers 124*a*, 124*b* an atomic layer deposition process.

Notes

In most of the embodiments shown so far, each nozzle is surrounded by an ink retainer, which defines a restricted area where the ink can flow from the nozzle.

In the examples, each nozzle is surrounded by its own ink retainer. Alternatively, several nozzles may be surrounded by a common ink retainer, i.e. one ink retainer may surround several nozzles.

Alternatively or in addition thereto, each support element of support structure 8 may be surrounded by an ink retainer, which defines an ink-free area around the support element, preventing the ink to reach the support element. This may be particularly advantageous if the support elements are forming individual, isolated pillars.

As can be seen in the embodiments shown above, the guard electrodes 42 are advantageously close to the axis of the nozzle. This is illustrated, by way of example, in FIG. 12.

Here, central axis 100 of nozzle 4, as it extends along ejection direction X, is shown in a dashed line. x1 is the distance between guard electrode 42 and nozzle axis 100. x2 is the distance between ink retainer 66 and nozzle axis 100. x3 is the distance between closest support element 78 and nozzle axis 2, with the support element 78 being the one adjacent to nozzle carrier 6.

The following relations are advantageous:

x1<x2, in particular x1<0.8·x2: By placing guard electrode 42 closer to nozzle axis 100 than ink retainer 66, a better shielding of ink retainer 66 is achieved.

x1<x3, in particular x1<0.8·x3, in particular x1<0.5·x3: Again, by placing the closest support element 78 further away from axis 100 than guard electrode 42, the support elements are shielded as well.

In addition or alternatively thereto, the difference x2−x1 is advantageously at least 50% of the vertical distance d' between guard electrode 42 and ink retainer 66.

In particular, x3 should be larger than x2 by at least 1 μm, in particular by at least 5 μm.

Hence, the following relations are advantageous, either alone or in any combination:

The distance x1 between guard electrode 42 and nozzle axis 100 is smaller than the distance x2 between ink retainer 66 and nozzle axis 100.

The distance x1 between guard electrode 42 and nozzle axis 100 is smaller than the distance x3 between axis 100 and the support element 78 adjacent to nozzle carrier 6 that is closest to nozzle axis 100.

The difference x2−x1 (between the distance x1 between guard electrode 42 and nozzle axis 100 and the distance x2 between ink retainer 66 and nozzle axis 100) is at least 50% of the vertical distance between guard electrode 42 and ink retainer 66.

The distance x3 (between axis 100 and the support element 78 adjacent to nozzle carrier 6) is larger than the distance x2 between ink retainer 66 and nozzle axis 100 by at least 1 μm, in particular by at least 5 μm.

The difference x2−x1 (between the distance x1 between guard electrode 42 and nozzle axis 100 and the distance x2 between ink retainer 66 and nozzle axis 100) is advantageously at least 50% of the vertical distance between guard electrode 42 and ink retainer 66.

As mentioned, the print head may also comprise gas ducts to feed gas to the region between the print head and the target and/or to retrieve gas from said region. These gas duct feeds may also comprise horizontal sections, such as interconnect sections, e.g. in front layer 10 and/or backing layer 12 and/or interposer layer 32, similar to the ink ducts shown in FIGS. 13 and 15.

In the embodiments described so far, three electrodes at three different vertical levels have been mentioned: the ejection electrodes, the guard electrodes, and the shielding electrodes. It must be noted, though, that there may also be other electrodes, such as:

Electrodes may be provided in nozzle carrier 6, e.g. at the supply ducts 15 and/or suction ducts 16, and/or at the nozzle and/or at the ink retainers for defining the potential of the ink. Such electrodes allow e.g. to keep the ink at a similar or the same potential as the guard electrodes 42. Advantageously, such electrodes are of platinum and/or gold.

Further electrodes (e.g. between ejection electrode 38 and shielding electrode 40 of FIG. 2) may be provided if differently sized nozzles are present on the print head. This is particularly useful for nozzles where the distance between the ejection electrode and the nozzle is considerable smaller than the distance between the shielding electrode and the ejection electrode.

While there are shown and described presently preferred embodiments of the invention, it is to be distinctly understood that the invention is not limited thereto but may be otherwise variously embodied and practiced within the scope of the following claims.

The invention claimed is:

1. An electrohydrodynamic print head comprising:

a nozzle carrier, a plurality of nozzles arranged on said nozzle carrier, wherein each nozzle forms a projection arranged on a front side of said nozzle and extending into an ejection direction (X) of the print head, a plurality of ejection electrodes associated with said nozzles and located on the front side of said nozzles, a support structure supporting said ejection electrodes on said nozzle carrier, wherein said support structure comprises a plurality of support elements arranged between said nozzles, a plurality of ink retainers arranged between said nozzles and said support elements, wherein, at a given nozzle, a closest ink retainer is arranged at a distance from the nozzle.

2. The print head of claim 1, wherein, along said ejection direction, the front surfaces of the ink retainers are located behind the front ends of the nozzles.

3. The print head of claim 1, wherein each ink retainer forms a ledge facing away from the nozzle closest to it.

4. The print head of claim 1, wherein said ink retainers are arranged on and project from the front side of the nozzle carrier.

5. The print head of claim 1, wherein each nozzle is surrounded by an ink retainer.

6. The print head of claim 1, wherein each support element is surrounded by an ink retainer.

7. The print head of claim 1, wherein, at a given nozzle, a surface of said ink retainer is more hydrophobic and/or oleophobic than a surface of said nozzle.

8. The print head of claim 1, wherein, between a given nozzle and a support element adjacent to nozzle carrier that is closest to the nozzle, there is a first recess located between said nozzle and said ink retainer and/or there is a second recess located between said ink retainer and said closest support element.

9. The print head of claim 8, wherein, along said ejection direction, a bottom of at least one of said first and second recess is at the back in respect to the front surface of the ink retainer.

10. The print head of claim 1, wherein said ink retainers are laterally arranged on said nozzles at a distance from a front end of the nozzles.

11. The print head of claim 10, wherein the front surfaces of the ink retainers are closer to the front side of the nozzle carrier than to the front end of the nozzles.

12. The print head of claim 1, comprising guard electrodes, wherein, at a given nozzle, the guard electrode is arranged between the ejection electrode and the ink retainer.

13. The print head of claim 12 further comprising a voltage supply adapted to set an electric potential of the guard electrodes closer to an electric potential of the ink retainers than to an electric potential of the ejection electrodes.

14. The print head of claim 12, wherein, at a given nozzle, there is a cavity formed between the guard electrode and the ink retainer.

15. The print head of claim 12, wherein the guard electrode is mounted to said support structure.

16. The print head of claim 12, wherein, for a given nozzle, the nozzle has a central nozzle axis extending along the ejection direction, wherein the guard electrode has a distance x1 from said nozzle axis, and wherein at least one of the following conditions applies:

the distance x1 is smaller than a distance x2 between the ink retainer and the nozzle axis, and the distance x1 is smaller than a distance x3 between the nozzle axis and the support element adjacent to the nozzle carrier that is closest to the nozzle axis, and the difference x2−x1 between the distance x1 and the distance x2 between the ink retainer and the nozzle axis is at least 50% of the vertical distance between the guard electrode and the ink retainer.

17. The print head of claim 12, wherein, at a given nozzle, said guard electrode is arranged in front of the ink retainer and the ejection electrode is arranged in front of the guard electrode.

18. The print head of claim 1, further comprising, in said nozzle carrier, a plurality of ink supply ducts for the nozzles.

19. The print head of claim 18, wherein each nozzle is surrounded by an ink retainer, and wherein, at a given nozzle, a closest ink retainer surrounds the nozzle and an end section of the supply duct.

20. The print head of claim 19, wherein, at a given nozzle, the supply duct emerges at a base section of the nozzle.

21. The print head of claim 20, wherein the supply duct is connected to at least one transversal exit duct extending transversally to said ejection direction.

22. The print head of claim 18, wherein at least one ink supply duct ends at each nozzle.

23. A method for operating the print head of claim 1 comprising: confining ink in region around a given nozzle by using said ink retainer and/or by sucking ink away from the nozzle by using the suction ducts.

24. The method of claim 23 comprising generating an electrical field at the forward end of at least one of the nozzles, thereby ejecting ink from said forward end, while, at the same time, keeping an electric field at the ink retainer at less than 50% of the field strength at the forward end of the nozzle.

25. The method of claim 23, comprising:

using ink supply ducts in the nozzle carrier to individually feed ink to the nozzles and using ink suction ducts in the nozzle carrier to individually suck ink from the nozzles.

26. The print head of claim 1, wherein the nozzles comprise:

a tip section, a shaft section, and a base section, with the tip section arranged in front of the shaft section and the base section arranged behind the shaft section, and wherein the tip section has a convex lateral surface.

27. The print head of claim 26, wherein the tip section is a cylinder without a groove.

28. An electrohydrodynamic print head comprising:

a nozzle carrier, a plurality of nozzles arranged on said nozzle carrier, wherein each nozzle forms a projection arranged on a front side of said nozzle carrier and extending into an ejection direction of the print head, a plurality of ejection electrodes associated with said nozzles and located on the front side of said nozzles, a support structure supporting said ejection electrodes on said nozzle carrier, wherein said support structure comprises a plurality of support elements arranged between said nozzles, a plurality of ink supply ducts for the nozzles, with at least one ink supply duct ending at each nozzle, and a plurality of ink suction ducts, with at least one ink suction duct ending at each nozzle, wherein, for a given nozzle, the nozzle is surrounded by openings of one or more suction ducts, wherein the openings are arranged between the nozzle and support elements next to it.

29. The print head of claim 28, further comprising, in said nozzle carrier, a plurality of ink supply ducts for the nozzles, wherein, at a given nozzle, the supply duct emerges at a base section of the nozzle, wherein each nozzle is surrounded by an ink retainer wherein, at a given nozzle, a closest ink retainer surrounds the nozzle and an end section of the supply duct, and wherein, at a given nozzle, the closest ink retainer surrounds an end section of the suction duct.

30. The print head of claim 28, further comprising at least one pump connected to said supply ducts and/or to said suction ducts.

31. The print head of claim 28, wherein the nozzles comprise:

a tip section, a shaft section, and a base section, with the tip section arranged in front of the shaft section and the base section arranged behind the shaft section, and wherein the tip section has a convex lateral surface.

32. The print head of claim 31, wherein the tip section is a cylinder without a groove.

33. An electrohydrodynamic print head comprising:

a nozzle carrier, a plurality of nozzles arranged on said nozzle carrier, wherein each nozzle forms a projection arranged on a front side of said nozzle carrier and extending into an ejection direction of the print head, a plurality of ejection electrodes associated with said nozzles and located on the front side of said nozzles, a plurality of ink supply ducts for the nozzles, with at least one ink supply duct ending at each nozzle, and a plurality of ink suction ducts, with at least one ink suction duct ending at each nozzle, wherein at a given nozzle;

the supply duct is connected to at least one transversal exit duct extending transversally to said ejection direction and, in addition, the supply duct is connected to an axial exit duct extending towards a tip of the nozzle.

34. An electrohydrodynamic print head comprising:

a nozzle carrier, a plurality of nozzles arranged on said nozzle carrier, wherein each nozzle forms a projection arranged on a front side of said nozzle carrier and extending into an ejection direction of the print head, a plurality of ejection electrodes associated with said nozzles and located on the front side of said nozzles, a plurality of ink supply ducts for the nozzles, with at least one ink supply duct ending at each nozzle, and a plurality of ink suction ducts, with at least one ink suction duct ending at each nozzle, wherein said nozzle carrier comprises a front layer, wherein said nozzles are mounted to a front side of the front layer, a backing layer located at a back side of said front layer, wherein electrical vias connected to the ejection electrodes extend through the front layer and the backing layer and wherein ink ducts are located in said front layer.

35. The print head of claim 34 wherein the front layer is a dielectric layer and/or the backing layer is a dielectric layer.

36. The print head of claim 34, comprising, in said nozzle carrier, a plurality of ink supply ducts for the nozzles; and in said front layer, interconnect sections for said ink extending transversally to said ejection direction, wherein each nozzle is surrounded by an ink retainer, and wherein, at a given nozzle, a closest ink retainer surrounds the nozzle and an end section of the supply ducts.

37. The print head of claim 36 wherein a plurality of the vias are arranged in an array in said backing layer and no ink ducts extend through the backing layer within a convex hull of said array.

* * * * *